United States Patent [19]
Kunishige

[11] Patent Number: 5,005,970
[45] Date of Patent: Apr. 9, 1991

[54] DISTANCE DETECTING APPARATUS

[75] Inventor: Keiji Kunishige, Hachioji, Japan

[73] Assignee: Olympus Optical Co., Ltd., Japan

[21] Appl. No.: 318,723

[22] Filed: Mar. 3, 1989

[30] Foreign Application Priority Data

Mar. 4, 1988 [JP] Japan .................................. 63-52416

[51] Int. Cl.$^5$ .......................... G01C 3/10; G01C 3/08
[52] U.S. Cl. .......................................... 356/1; 356/4
[58] Field of Search ....................... 356/1, 4; 354/403; 250/201 AF, 214 P

[56] References Cited

U.S. PATENT DOCUMENTS

| | | | |
|---|---|---|---|
| 4,274,735 | 6/1981 | Tamura et al. | 356/1 |
| 4,490,037 | 12/1984 | Anagnostopoulos et al. | 356/1 |
| 4,601,574 | 7/1986 | Yamane et al. | 356/1 |
| 4,773,751 | 9/1988 | Matsuda et al. | 356/1 |
| 4,849,781 | 7/1989 | Nakazawa et al. | 354/403 |

FOREIGN PATENT DOCUMENTS 99420 6/1984 Japan .
250945 5/1987 Japan .

Primary Examiner—Linda J. Wallace
Attorney, Agent, or Firm—Louis Weinstein

[57] ABSTRACT

A light projector projects a light pulse upon an object being photographed. A position sensitive detector (PSD) receives reflected light from the object and produces photocurrents which depend on the position of incidence of the light thereon. The detector (PSD) is positioned so that the center of an imaging spot formed by the reflected light from the object when the latter is located at infinity is located toward the projector with respect to the center of PSD. Apparatus additionally comprising a detector circuit which detects the photocurrents produced by PSD as superimposed with bias currents, a calculation and output circuit which calculates and delivers information representing a distance to the object on the basis of photocurrent outputs which are superimposed with the bias currents, and a bias current ratio preset circuit which presets a bias current ratio so that a calculated output is substantially proportional to the reciprocal of the distance to the object over an entire range of distances across which the determination of a distance is enabled.

43 Claims, 13 Drawing Sheets

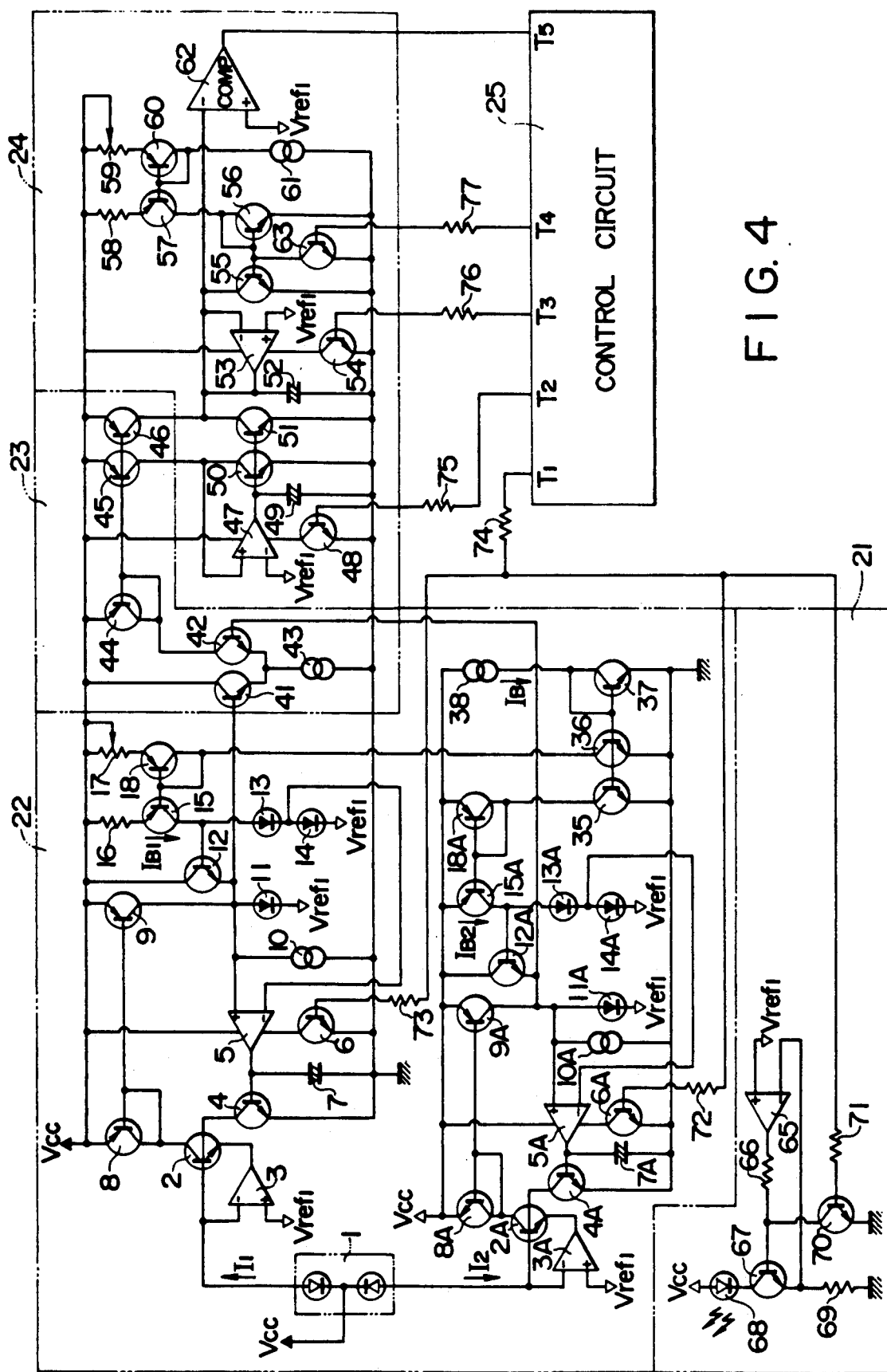
F I G. 4

DISTANCE DETECTING APPARATUS

FIELD OF THE INVENTION AND RELATED ART STATEMENT

The invention relates to a distance detecting apparatus, and more particularly, to such apparatus of the active type in which a light projecting element projects light to an object being photographed, which then reflects it so as to be detected by a light receiving element which is located at a given baseline distance from the light projecting element in order to determine a distance to the object being photographed.

A distance detecting apparatus of active type in which light is projected to and reflected from an object being photographed for reception in order to determine a distance to an object being photographed has been already well known as disclosed in Japanese Laid-Open Patent Application No. 99,420/1984. In order to accommodate for a telescopic photographing operation which utilizes a long focus lens or a panning operation, an improved performance of such apparatus has been demanded recently. Thus, an improved accuracy is required in the determination of distance to enable a telescopic photographing to a greater distance while maintaining an in-focus condition. On the other hand, an increase in the extent in which the determination of a distance is enabled is required for a panning operation.

Conventional distance detecting apparatus involved problems which caused their failure to meet such demands. A conventional distance detecting apparatus of active type is illustrated in FIG. 6 where it will be noted that a light pulse emitted by a light projecting element 39 is condensed by a projector lens 26 to irradiate an object 28 being photographed, and reflection therefrom is focused by a light receiving lens 27 to be imaged on a semiconductor position sensitive device (PSD) 1. PSD 1 has its center aligned with the optical axis of the lens 27. Thus, if an imaging point formed by reflected light from an object being photographed which is located at infinity, coincides with the center of PSD 1, then by representing the length of a baseline by L, a displacement of the imaging point from the optical axis by x, the focal length of the lens 27 by $f_J$ and a distance to the object being photographed by a, we have $$x = f_J \cdot L/a \quad (1)$$

Representing a total photocurrent by $I_\phi$, and the entire length of PSD 1 by 2t, photocurrents $I_1$ and $I_2$ produced by the reflected light will be as follows:

$$I_1 = \left( \frac{t - f_J \cdot L/a}{2t} \right) I_\phi \quad (2)$$

$$I_2 = \left( \frac{t + f_J \cdot L/a}{2t} \right) I_\phi \quad (3)$$

$$I_1 + I_2 = I_\phi \quad (4)$$

It will be seen from the equations (2) and (3) that distance information L/a is contained in the photocurrents $I_1$ and $I_2$, and hence the distance information a can be determined by a calculation which utilizes the photocurrents $I_1$ and $I_2$.

A variety of approaches are available to calculate a distance. Typical examples will be described below.

1. $\dfrac{I_2}{I_1 + I_2}$

Using a distance calculation circuit shown in FIG. 7, this fraction $I_2/(I_1+I_2)$ is determined. The circuit shown in FIG. 7 comprises transistors 41, 42, 44 and 46, a constant current source 43 which provides a constant current $I_E$, compression diodes 11, 11A which perform a logarithmic compression of a detection output from the PSD and provide the resulting value to the bases of the transistors 41 and 42, and a pair of buffer circuits $B_{uf1}$, $B_{uf2}$ which are connected between the diodes 11, 11A and the bases of the transistors 41, 42, respectively. While a detailed description of the calculation is omitted, the circuit provides a calculated output $I_0$, which is defined as follows:

$$I_0 = \frac{I_2}{I_1 + I_2} \cdot I_E \quad (5)$$

Substitution of the equations (2) and (3) into the equation (5) yields:

$$I_0 = \frac{t + f_J \cdot L/a}{2t} \cdot I_E \quad (6)$$
$$= \left( \frac{1}{2} + \frac{f_J \cdot L}{2t} \cdot \left( \frac{1}{a} \right) \right) \cdot I_E$$

Accordingly, the relationship between the reciprocal of the distance a and the calculated output $I_0$ is represented by a rectilinear line $l_1$ having a slope of $$\frac{f_J \cdot L}{2t} \cdot I_E$$

as graphically shown in FIG. 8.

2. $\dfrac{I_2 - I_1}{I_1 + I_2}$

This approach utilizes a calculation circuit shown in FIG. 9 to calculate the fraction $(I_2-I_1)/(I_1+I_2)$. The circuit shown in FIG. 9 comprises a differential amplifier formed by transistors 121 to 124 and a constant current source 129 which provides a constant current $I_E$, transistors 125 to 128, and a pair of buffer circuits $B_{uf3}$, $B_{uf4}$, which are connected together in a manner shown. First photocurrent $I_1$ and second photocurrent $I_2$ are supplied to the bases of transistors 122 and 124, respectively, in the differential amplifier. Transistors 121 and 125 form current mirror circuits, as do transistors 123 and 127. Accordingly, a current which passes through the transistors 125, 126 is equal to the current flow through the transistor 122, and a current which passes through the transistors 127, 128 is equal to the current flow through the transistor 124. Accordingly, the differential amplifier provides a calculated output $I_0$ from the collector of the transistor 128 as follows:

$$I_0 = \frac{I_2 - I_1}{I_1 + I_2} \cdot I_E \quad (7)$$

The substitution of the equations (2) and (3) into the equation (7) yields:

$$I_0 = \frac{f_J \cdot L}{t} \cdot \left(\frac{1}{a}\right) \cdot I_E \qquad (8)$$

Accordingly, the relationship between the reciprocal of the distance a and the calculated output $I_0$ will be represented by a linear line $l_4$ having a slope $(f_J \cdot L) \cdot I_E/t$.

3. $V_T \ln(I_2/I_1)$

A calculation circuit as shown in FIG. 11 is used to calculate $V_T \ln(I_2/I_1)$. In the circuit shown in FIG. 11, currents $I_1$, $I_2$ from a photocurrent detector circuit are fed to non-inverting inputs of operational amplifiers 131, 132, each forming a voltage follower for impedance transformation. A subtraction circuit comprising an operational amplifier 133 and resistors 134 to 137 performs a calculation according to the following formula:

$$V_T \ln I_2 - V_T \ln I_1 = V_T \ln \frac{I_2}{I_1}$$

which is the output from the amplifier 133. Thus, a calculated output $V_0$ is given as follows:

$$V_0 = V_T \ln(I_2/I_1) \qquad (9)$$

Substitution of the equations (2) and (3) into the equation (9) yields:

$$V_0 = V_T \ln \frac{t/f_J \cdot L + 1/a}{t/f_J \cdot L - 1/a} \qquad (10)$$

Differentiating the calculated output $V_0$ with respect to the reciprocal $(1/a)$ of the distance, we have:

$$d\,V_0/d(1/a) = \frac{2(t/f_J \cdot L)}{(t/f_J \cdot L)^2 - (1/a)^2} \qquad (11)$$

Thus, if the distance is such that the following inequality prevails:

$$(t/f_J L)^2 > (1/a)^2 \qquad (12)$$

the result would be represented by a rectilinear line having a slope equal to $2f_J L/t$. The slope will increase for other distances. In a range of distances which are normally encountered, a region can be established in which the inequality (12) applies, and hence the relationship between the calculated output $V_0$ and the reciprocal of the distance a will be as graphically shown in FIG. 12.

It will be seen that a calculated output representing the distance determined will be plotted against the reciprocal of a distance to an object being photographed by a single characteristic curve. However, since the magnitude of signal light from the object being photographed will be a very weak photocurrent on the order of several tens of pA to several tens of nA, it will be influenced by random noises which are inherent in the detector circuit, giving rise to a degree of uncertainty. By way of example, the line $l_1$ shown in FIG. 8 will actually be in a band-shaped region, shown hatched, which is defined between curves $l_2$ and $l_3$ and exhibiting a noise magnitude $A_1$, as shown in FIG. 13, for example. This means that the calculated output will be located in a region having a certain breadth with a certain probability, thus resulting in a departure from a one-to-one correspondence as graphically illustrated in FIG. 8. Thus, a calculated output of an equal magnitude may be produced at distances $a_1$ and $a_2$, as illustrated in FIG. 13, and the arrangement fails to discriminate one from the other. Accordingly, a distance determining apparatus will exhibit an accuracy of determination which is represented as a magnitude $(1/a_1 - 1/a_2)$ which is obtained when distances $a_1$ and $a_2$ can be completely discriminated from each other. The smaller this magnitude, the higher the capability with which the apparatus is able to detect a distance and to discriminate closely spaced distances from each other.

FIG. 14 graphically shows another relationship of a calculated output plotted against the reciprocal of the distance a having a different slope. It will be apparent from a comparison between FIGS. 13 and 14 that when a common photocurrent detector circuit is used, resulting noise magnitude $A_1$ will be equal, and hence the accuracy of determining the distance will be improved in proportion to the magnitude of the slope. It will be noted from the equation (6) that the slope can be increased by increasing the length of the baseline L or the focal length $f_J$ of the light receiving lens or reducing the total length 2t of the PSD.

FIGS. 15A to 15E illustrate the relationship between the length of the baseline L, the focal length $f_J$ of the lens 27 and the total length 2t of PSD 1. As compared to the relationship shown in FIG. 15A which illustrates a conventional apparatus, the length of the baseline L is increased in FIG. 15B while the focal length $f_J$ of the lens 27 is increased in FIG. 15C. Alternatively, the total length 2t of PSD 1 is reduced in FIG. 15D. In this manner, the slope of the calculated output can be increased.

However, increasing the slope of the calculated output response to improve the accuracy of determining the distance causes an inconvenience that a nearest limit which permits the distance measurement to be removed, as will be noted from FIGS. 15B to 15D. With a distance detecting apparatus of the kind described, it is necessary that reflected light from an object being photographed entirely impinges upon a light receiving area of a PSD. Thus, nearest limit which enables the determination of a distance, $a_{min}$ is defined as follows:

$$a_{min} = f_J L/t \qquad (13)$$

By comparison with the equation (6), it will be noted that this equation represents the slope of the calculated output. Stated differently, increasing the slope results in increasing the nearest limit $a_{min}$, thus antinomy.

To overcome such a problem, it may be contemplated to shift the center of PSD 1 from the imaging point which is formed by reflected light from an object being photographed which is located at infinity, in a direction opposite from the light projecting element 39 along the baseline. Denoting such a shift by $\Delta x$, the nearest limit which enables the determination of the distance is given as follows:

$$a_{min} = f_J L/(t + \Delta x) \qquad (14)$$

thus allowing the nearest limit to be brought closer by an amount corresponding to the shift $\Delta x$.

If we now reduce the total length of PSD 1 from 2t to $t' = 2t/k$ where k is a constant, the slope of the calculated output will be increased to k-times its previous value, thus improving the accuracy by a factor k. By determining the shift $\Delta x$ so that the equation $f_J L/(t' + \Delta x) = f_J L/t$ is satisfied, the extent in which the determination of a distance is enabled can be extended without bringing the nearest limit further. The same applies when changing the focal length $f_J$ of the lens or the length L of the baseline.

Considering the limited space requirement within a camera, it is advantageous to reduce the overall length of PSD 1, which also contributes to the achievement of a reduced cost inasmuch as a PSD of a better yield is used. Furthermore, a reduction in the light responsive area of a PSD reduces the influence of noise caused by background lighting. As a consequence, the antinomy mentioned above can be avoided by shifting the center of PSD 1 in a direction remote from the light projecting element from the imaging point which is formed by reflected light from an object being photographed which is located at infinity.

However, in actuality, such shift causes another inconvenience in conjunction with the response of a signal detector circuit, which will now be considered. FIG. 16 illustrates that signal photocurrents $I_{p1}$, $I_{p2}$ produced by PSD 1 are detected by a signal detector formed by a preamplifier which comprises a pair of operational amplifiers 3, 3A and a pair of transistors 2, 2A. It will be noted that the signal photocurrents $I_{p1}$, $I_{p2}$ will be detected in superimposition with bias currents $I_{B1}$, $I_{B2}$. Thus, photocurrents $I_{1b}$, $I_{2b}$ which include the bias currents will be given as follows:

$$I_{1b} = I_{p1} + I_{B1} \quad (15)$$

$$I_{2b} = I_{p2} + I_{B2} \quad (16)$$

When the photocurrents $I_{1b}$, $I_{2b}$ are fed to the circuit as shown in FIG. 7 to perform a calculation according to the formula (5), there is obtained a calculated output $I_0$, which is given as follows:

$$I_0 = \frac{I_{2b}}{I_{1b} I_{2b}} \quad (17)$$

$$= \frac{I_{p2} + I_{B2}}{(I_{p1} + I_{p2}) + (I_{B1} + I_{B2})}$$

As shown in the equations (2) and (3), the photocurrents $I_{p1}$, $I_{p2}$ are given as follows:

$$I_{p1} = \left( \frac{t - (f_J L/a + \Delta x)}{2t} \right) I_\phi \quad (18)$$

$$I_{p2} = \left( \frac{t + (f_J \cdot L/a - \Delta x)}{2t} \right) I_\phi \quad (19)$$

$$I_{p1} + I_{p2} = I_\phi \quad (20)$$

$I_\phi$ appearing in the equation (2) represents a total photocurrent which is obtained as a result of a photoelectric conversion of the total received amount of reflected light which decreases inversely with the square of the distance and which will be zero at infinity. Thus, a calculated output $I_0$ representing the distance will be given as follows:

$$I_0 = \frac{\left( \frac{t + (f_J \cdot L/a - \Delta x)}{2t} \right) I_\phi + I_{B2}}{I_\phi + I_{B1} + I_{B2}} \quad (21)$$

When an object being photographed is located at a small distance or $I_\phi > I_{B1} + I_{B2}$, we can use an approximation as follows:

$$I_0 (I_\phi > I_{B1} + I_{B2}) \approx \frac{1}{2} - \frac{\Delta x}{2t} + \left( \frac{f_J \cdot L}{2t} \right)\left( \frac{1}{a} \right) \quad (22)$$

When an object being photographed is located at a greater distance or $I_{100} > I_{B1}, I_{B2}$, the following approximation applies:

$$I_0 (I_\phi < I_{B1}, I_{B2}) \approx \frac{I_{B2}}{I_{B1} + I_{B2}} \quad (23)$$

It will be seen from the equations (22) and (23) that when an object being photographed is located at a small distance, the calculated output $I_0$ will be linearly proportional to the reciprocal of the distance while when the object is located at infinity, it will converge to a value which is determined by the bias currents $I_{B1}$, $I_{B2}$ which are superimposed upon the signal photocurrents $I_{p1}$, $I_{p2}$. This is graphically illustrated in FIG. 17 where it is to be noted that the calculated output $I_0$ for an object being photographed which is located at infinity should converge to $$\frac{1}{2} - \frac{\Delta x}{2t}$$

with signal photocurrents $I_{p1}$, $I_{p2}$ alone on which the bias currents $I_{B1}$, $I_{B2}$ are not superimposed, but in actuality, it converges to $$\frac{I_{B2}}{I_{B1} + I_{B2}}$$

due to the bias currents. In other words, the reciprocal of the distance a to an object being photographed is not linearly related to the calculated output $I_0$, but a region $A_2$ is produced where a single value of the calculated output corresponds to two different distances, thus causing a difficulty that the determination of a distance is rendered impossible.

OBJECT AND SUMMARY OF THE INVENTION

It is an object of the invention to overcome the described inconvenience by providing a distance detecting apparatus having an increased extent of distances which can be determined and also having an improved accuracy of determination as compared with conventional arrangements.

In accordance with the invention, the inability to determine a distance due to a distortion in a calculated output which is caused by bias currents in a detector circuit and a shift $\Delta x$ between a light projecting element and a light receiving element can be overcome, thus advantageously achieving a substantial improvement in the accuracy and the extent of distances over the prior art.

BRIEF DESCRIPTION OF THE DRAWINGS

FIG. 4 is a detailed circuit diagram of a distance determining circuit used in the distance detecting apparatus of the invention;

DETAILED DESCRIPTION OF PREFERRED EMBODIMENTS

Figure 3A:
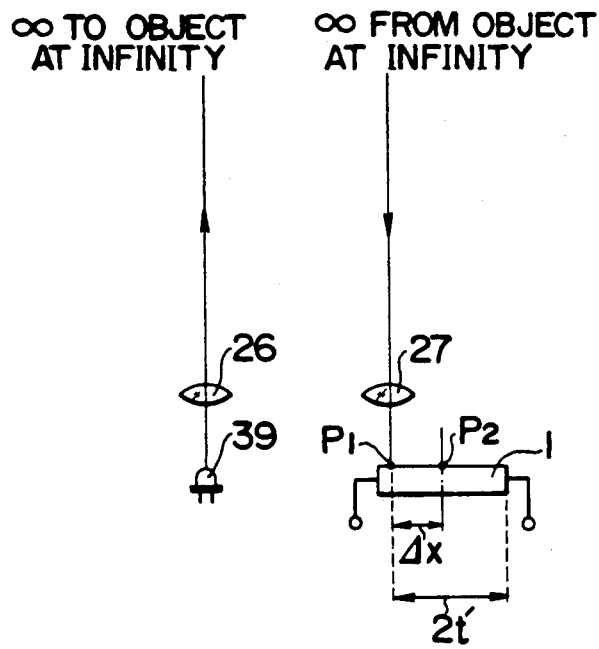
FIGS. 3A and 3B are schematic illustrations of a distance determining optical system used in the distance detecting apparatus of the invention.
Figure 3B:
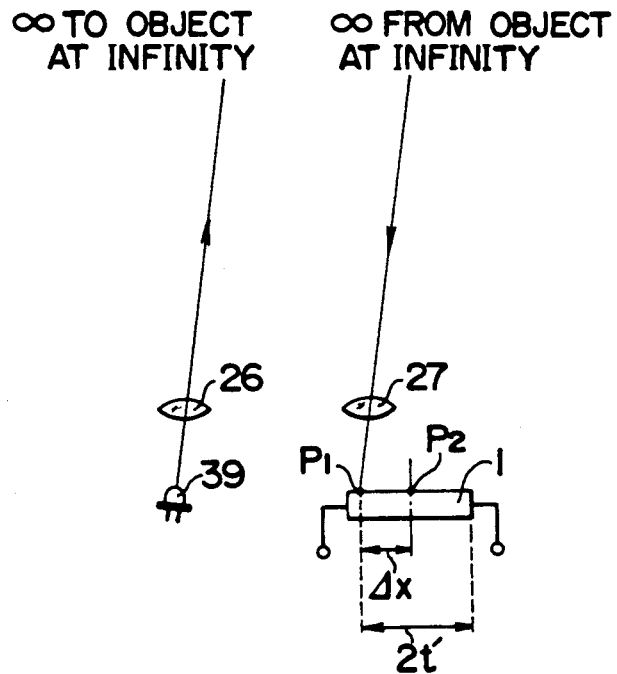

FIGS. 3A and 3B show layouts for a distance determining optical system which may be used in a distance detecting apparatus according to the invention. Specifically, a light projecting element comprises IRED 39, and a light receiving element comprises PSD 1. Projector means 26 projects light from the light projecting element 39 toward an object being photographed along an optical axis of projection. An incident ray of light which passes through the principal point of the light receiving lens 27 in parallel relationship with the axis of projection impinges upon PSD 1 at point $P_1$, which represents an imaging point which is formed by reflected light from an object being photographed which is located at infinity. As shown in FIGS. 3A and 3B, the element 39 and PSD 1 are positioned relative to each other such that the center $P_2$ of PSD 1 shifts by a distance Ax along a baseline from the point $P_1$ in a direction away from the element 39. It is such layout of the optical system that enables the extent of distances to be extended and the accuracy of determining a distance to be improved.

Figure 6:
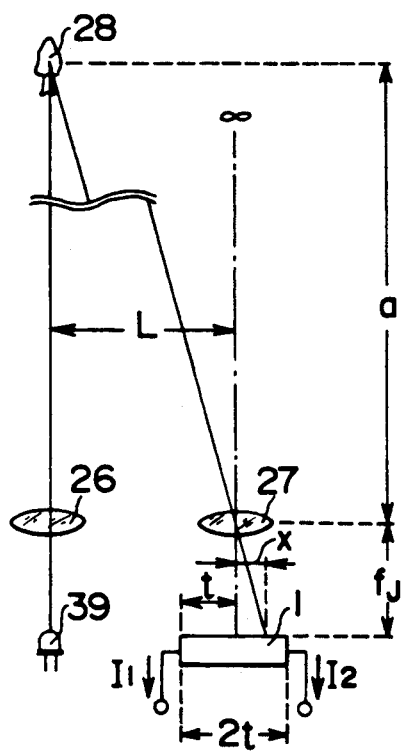
FIG. 6 is a schematic illustration of a distance determining optical system as used in a conventional distance detecting apparatus.

Specifically, a photoelectric transducer element as typically illustrated by a PSD used in a distance detecting apparatus of the invention is located such that of an imaging point formed by reflected light from an object being photographed which is located at infinity is disposed nearer the light projecting means as referenced to the center of the photoelectric transducer element, generally as shown in FIGS. 3A and 3B. This allows an effective utilization of substantially the entire length 2t' of the photoelectric transducer element in comparison to a conventional arrangement shown in FIG. 6 where only one-half the total length 2t of the transducer element contributes to the determination of a distance. It will be seen that a calculated output representing a distance determined, as plotted against the reciprocal of an object being photographed which is taken on the abscissa, has a slope which is equal to $f_J \cdot L/2t$ and $f_J \cdot L/2t'$, respectively. Accordingly, assuming an equal effective length of a PSD which contributes to the determination of a distance, it will be seen that the PSD used in accordance with the invention as illustrated in FIGS. 3A and 3B may have a total length which may be one-half the total length of a PSD used in a conventional arrangement as shown in FIG. 6. Thus, the accuracy of determining a distance which can be achieved in accordance with the invention can be improved by a factor of two as compared with the accuracy of the conventional arrangement.

Noise levels which occur in the arrangement of the invention shown in FIGS. 3A and 3B, as compared to those occurring in the conventional arrangement of FIG. 6, will now be considered. In the conventional arrangement shown in FIG. 6, a calculated output $I_0$ can be formulated as follows, taking noise currents $I_{N1}$, $I_{N2}$ which are given by the equation (17) into consideration:

$$I_0 = \frac{I_{p2} + I_{B2} + I_{N2}}{I_{p1} + I_{p2} + I_{B1} + I_{B2} + I_{N1} + I_{N2}} \quad (24)$$

Representing a maximum absolute value of noise components $I_{N1}$, $I_{N2}$ by $I_N$, it will be seen that these noise components may have a value between $-I_N$ to $+I_N$.

Hence, the calculated output $I_0$ including the noise components will assume a value which is between Max-($I_0$) and Min($I_0$):

$$Max(I_0) = \frac{I_{p2} + I_{B2} + I_N}{I_{p1} + I_{p2} + I_{B1} + I_{B2}} \quad (25)$$

$$Min(I_0) = \frac{I_{p2} + I_{B2} - I_N}{I_{p1} + I_{p2} + I_{B1} + I_{B2}} \quad (26)$$

where the photocurrent $I_{p1}$, $I_{p2}$ are given as follows:

$$I_{p1} = \frac{t - f_J \cdot L/a}{2t} I_\phi \quad (27)$$

$$I_{p2} = \frac{t + f_J \cdot L/a}{2t} I \quad (28)$$

By contrast, a calculated output $I'_0$ from the arrangement of the invention shown in FIGS. 3A and 3B including noise component $I_N$ will assume a value between Max($I'_0$) and Min($I'_0$):

$$Max(I'_0) = \frac{I'_{p2} + I_{B2} + I_N}{I'_{p1} + I'_{p2} + I_{B1} + I_{B2}} \quad (29)$$

$$Min(I'_0) = \frac{I'_{p2} + I_{B2} - I_N}{I'_{p1} + I'_{p2} + I_{B1} + I_{B2}} \quad (30)$$

where $I'_{p1}$, $I'_{p2}$ represent photocurrents from a first and a second anode of PSD, as given below:

$$I'_{p1} = \frac{t' - (f_J \cdot L/a - \Delta x)}{2t'} I_\phi \quad (31)$$

$$I'_{p2} = \frac{t' + (f_J \cdot L/a - \Delta x)}{2t'} I_\phi \quad (32)$$

For purpose of illustration, following the specific values will be assumed: a=10 m; $f_J$=18 mm; L=42 mm; $\Delta x$=0.5 mm; t=3 mm; t'=1.5 mm; $I_{B1}$=100 pA; $I_{B2}$=100 pA; $I_\phi$=600 pA; and $I_N$=100 pA. The substitution of these values into the equations (25) to (28) yields:
$I_{p1}$=292 pA
$I_{p2}$=307 pA
Max($I_0$)=0.634
Min($I_0$)=0.384 1
The magnitude of uncertainty caused by noise will be as follows:

$$Max(I_0) - Min(I_0) = 0.25$$

When the same specific values are substituted into the equations (29) to (32) which apply to the present invention, we have:
$I'_{p1}$=385 pA
$I'_{p2}$=215 pA
Max($I_0$)=0.519
Min($I_0$)=0.269
Thus, the magnitude of uncertainty caused by noises will be as follows:

$$Max(I_0) - Min(I_0) = 0.25$$

Thus, the magnitude of uncertainty caused by noise remains the same in each instance while the accuracy is doubled according to the invention.

Figure 1:
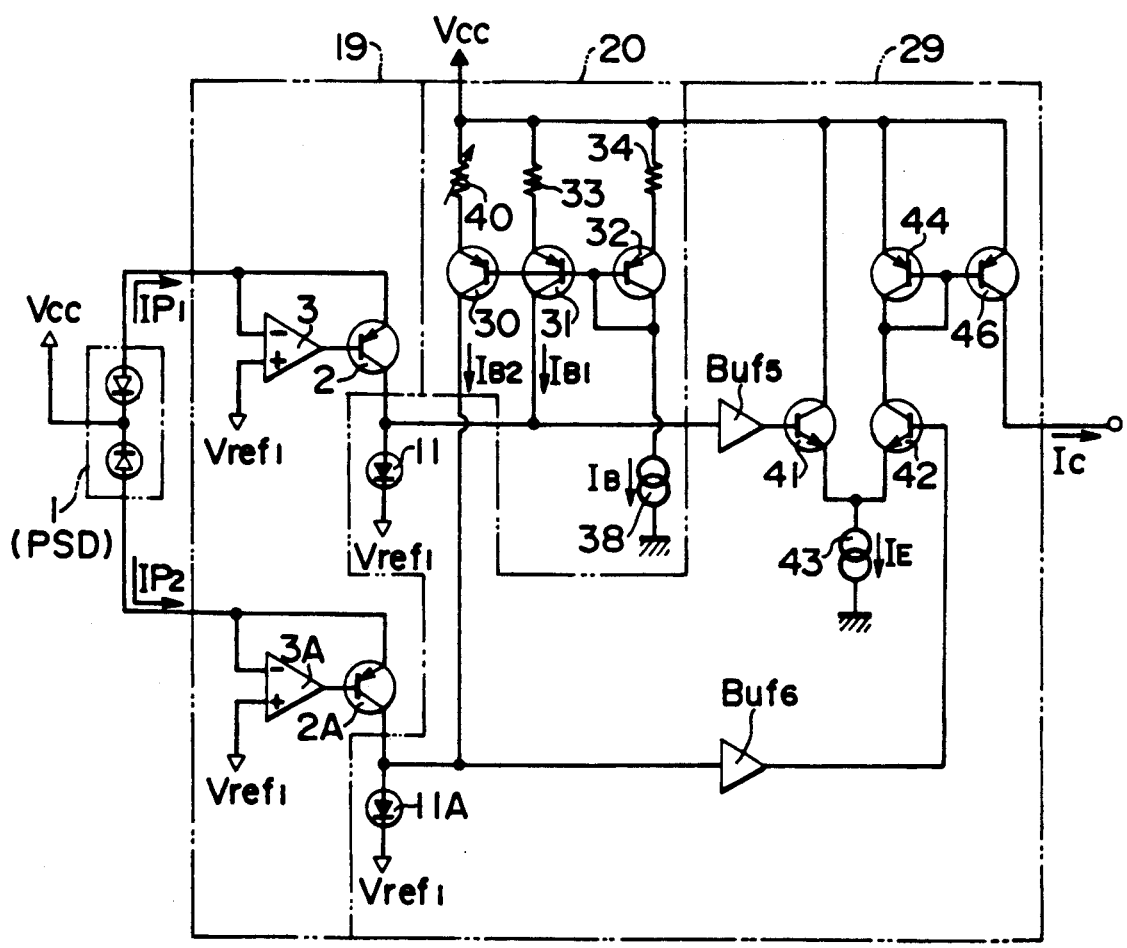
FIG. 1 is a circuit diagram of an essential part of the distance determining circuit of a distance detecting apparatus according to one embodiment of the invention.

FIG. 1 is a circuit diagram of an essential part of a distance determining circuit, illustrating the principle of a distance detecting apparatus according to one embodiment of the invention. For the convenience of simplicity, a portion of the circuit arrangement relating to an active auto-focus function such as a background light elimination circuit which is known in itself is omitted from illustration. In addition, circuitry which is normally associated with a calculated output in order to convert an output current Ic into a corresponding digital code is also omitted from illustration since a variety of techniques may be used to construct it.

In this embodiment, a distance determining circuit comprises PSD 1 functioning as a photoelectric transducer element, a detector circuit 19 which detects a signal photocurrent from PSD 1, a bias current ratio preset circuit 20 which presets a value of bias currents which are to be superimposed upon the signal photocurrents, and a calculation and output circuit 29 which performs a calculation to determine a distance.

Figure 7:
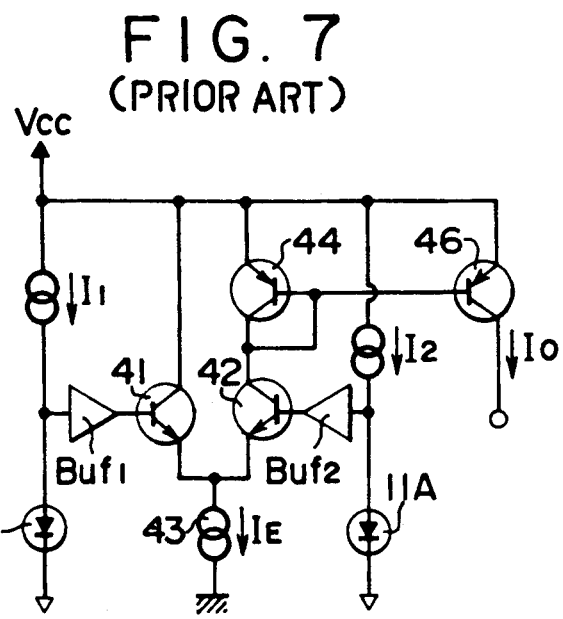
FIG. 7 is a circuit diagram of an exemplary distance calculating circuit used in a conventional distance detecting apparatus.
Figure 8:
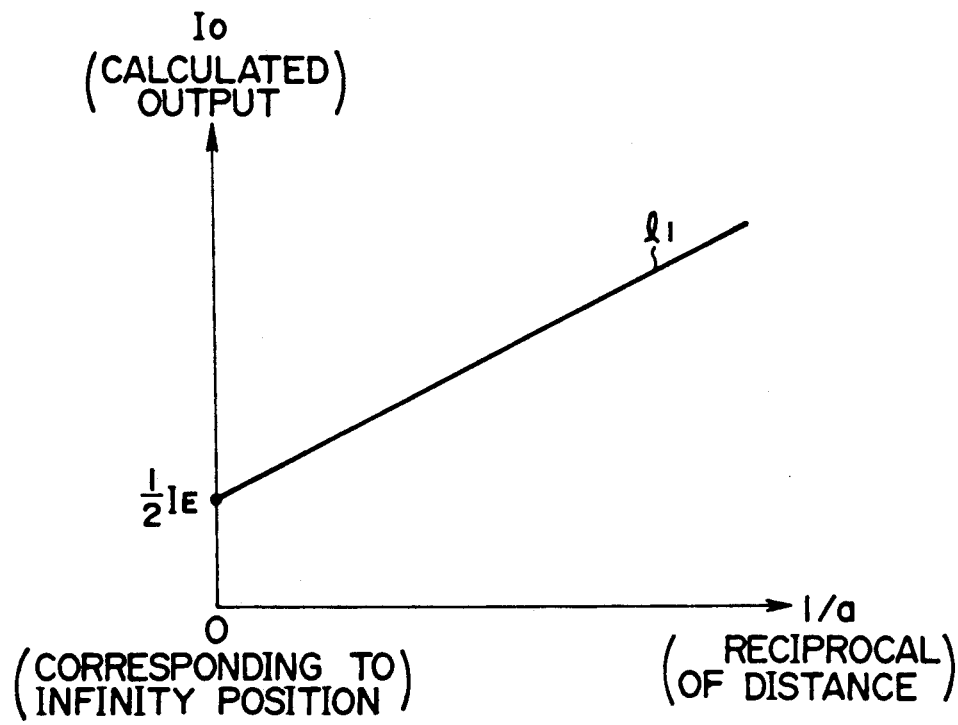
FIG. 8 graphically shows a relationship between a calculated output and a distance to an object being photographed which illustrates the response of an arrangement shown in FIG. 7.

More specifically, the detector circuit 19 comprises a pair of operational amplifiers 3, 3A for respectively amplifying first and second signal photocurrents $I_{p1}$, $I_{p2}$ which are delivered from PSD 1, and a pair of transistors 2, 2A having their respective bases connected to the outputs of the corresponding amplifiers 3, 3A and having their respective emitters connected to the inverting input terminals of the corresponding amplifiers as a feedback connection. The bias current ratio preset circuit 20 comprises transistors 30, 31, 32, which form current mirror circuits, a variable resistor 40 and fixed resistors 33, 34 which are connected between the respective emitters of the transistors 30, 31, 32, respectively, and a bus which is fed with a supply voltage Vcc for presetting values of bias currents, and a constant current source 38 which supplies a constant current to the mirror transistors 30, 31, 32. The calculation and output circuit 29 includes a distance calculation circuit shown in FIG. 7 which comprises transistors 41, 42, 44 and 46 and a constant current source 43 and which circuit is arranged to calculate $I_2/(I_1+I_2)$, a pair of compression diodes 11, 11A which perform and feed a logarithmic compression of an output from the detector circuit 19 to the respective bases of the transistors 41 and 42, and a pair of buffer circuits Buf5, Buf6 connected between the compression diodes 11, 11A and the bases of the transistors 41, 42, respectively.

Figure 2A:
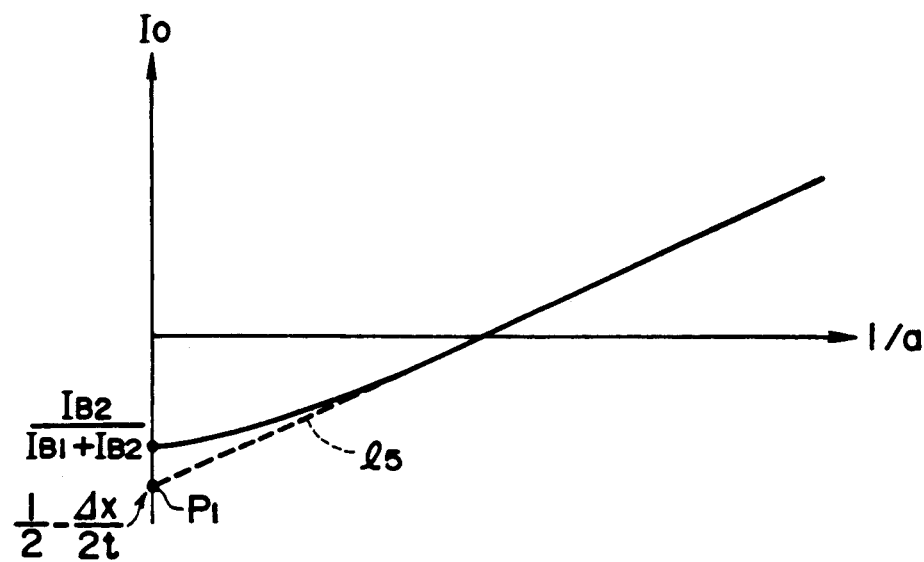
FIGS. 2A and 2B graphically show a calculated output plotted against the reciprocal of a distance to an object being photographed which is obtained in the manner illustrated in FIG. 1, FIGS. 2A and 2B representing the choice of a bias current ratio $I_{B2}/(I_{B1}+I_{B2})$ above and below, respectively, a theoretical value $\frac{1}{2}-\Delta x/2t$ for the calculated output $I_0$ when an object being photographed is located at infinity.
Figure 2B:
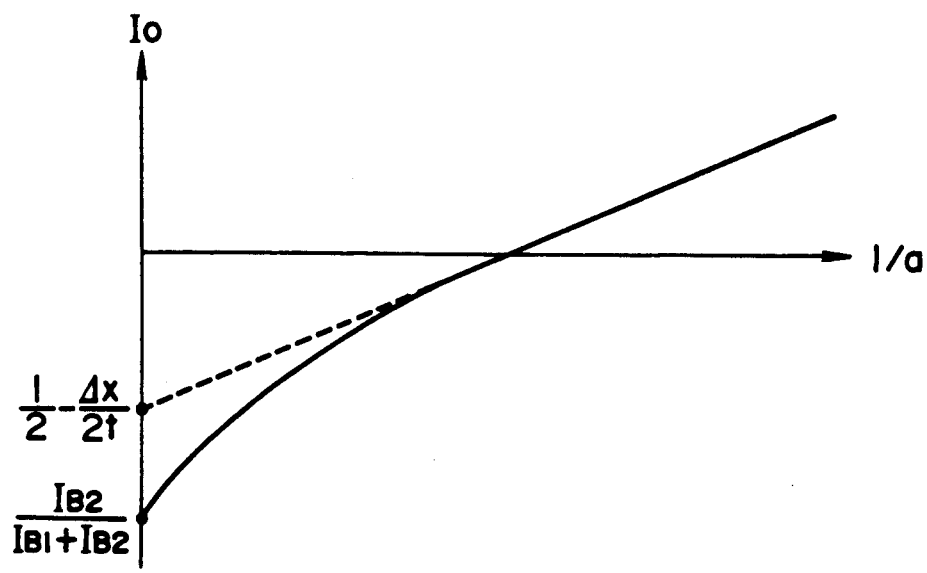
Figure 17:
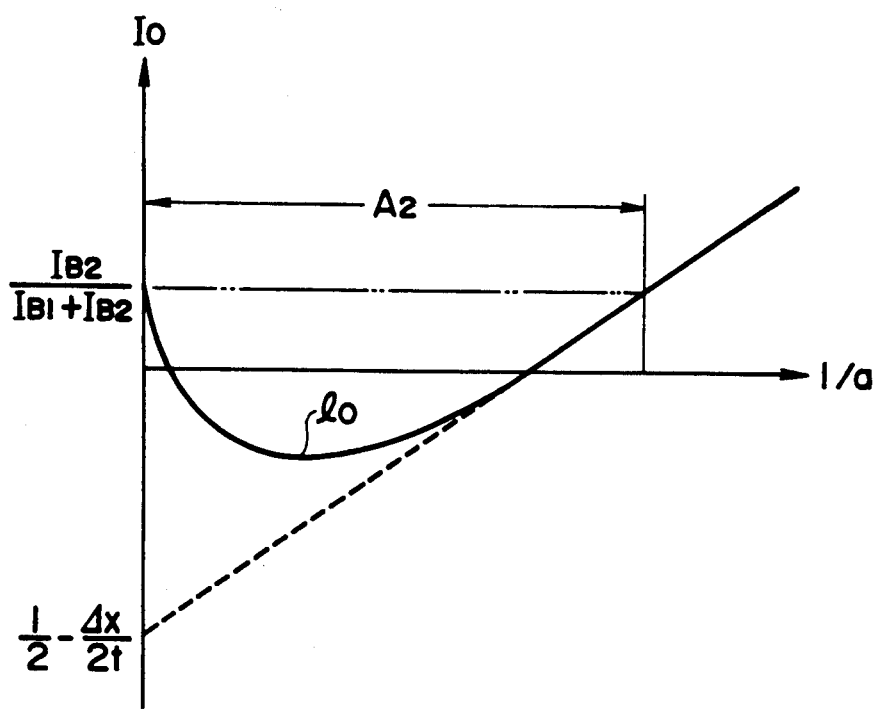
FIG. 17 graphically shows a relationship between a calculated output and a distance to an object being photographed which is located at infinity for the arrangement of FIG. 16.

In operation, the first photocurrent $I_{p1}$ delivered from one of the anodes of PSD 1 and the second photocurrent $I_{p2}$ delivered from the other anode are detected by the detector circuit 19, and then injected into the compression diodes 11, 11A, respectively. On the other hand, bias currents $I_{B1}$, $I_{B2}$ are delivered as collector currents from the transistors 31, 30, respectively, of the preset circuit 20 for injection into the compression diodes 11, 11A. Accordingly, the signal photocurrents $I_{p1}$, $I_{p2}$ on which the bias currents $I_{B1}$, $I_{B2}$ are superimposed flow through the compression diodes 11, 11A in the form of $I_{p1}+I_{B1}$ and $I_{p2}+I_{B2}$. The magnitude of the bias currents $I_{B1}$, $I_{B2}$ can be controlled by choosing suitable values for the resistors 33, 40 and 34, whereby the bias current ratio $I_{B2}/(I_{B1}+I_{B2})$ can be arbitrarily established. Thus it will be seen that the present embodiment satisfies the relationship represented by the equations (21) to (23). It is to be noted that the magnitudes of the bias currents $I_{B1}$, $I_{B2}$ must be determined such that a single value of calculated output cannot correspond to two distances to an object being photographed as illustrated by the response of FIG. 17 indicated by a solid line curve $I_0$. Accordingly, the values of the resistors 40, 33 and 34 are determined so that the calculated output $I_0$ assumes a value close to or less than the value $(\frac{1}{2} - \Delta x/2t)$ as illustrated in FIGS. 2A and 2B, by choosing a suitable bias current ratio $I_{B2}/(I_{B1}+I_{B2})$.

Figure 5:
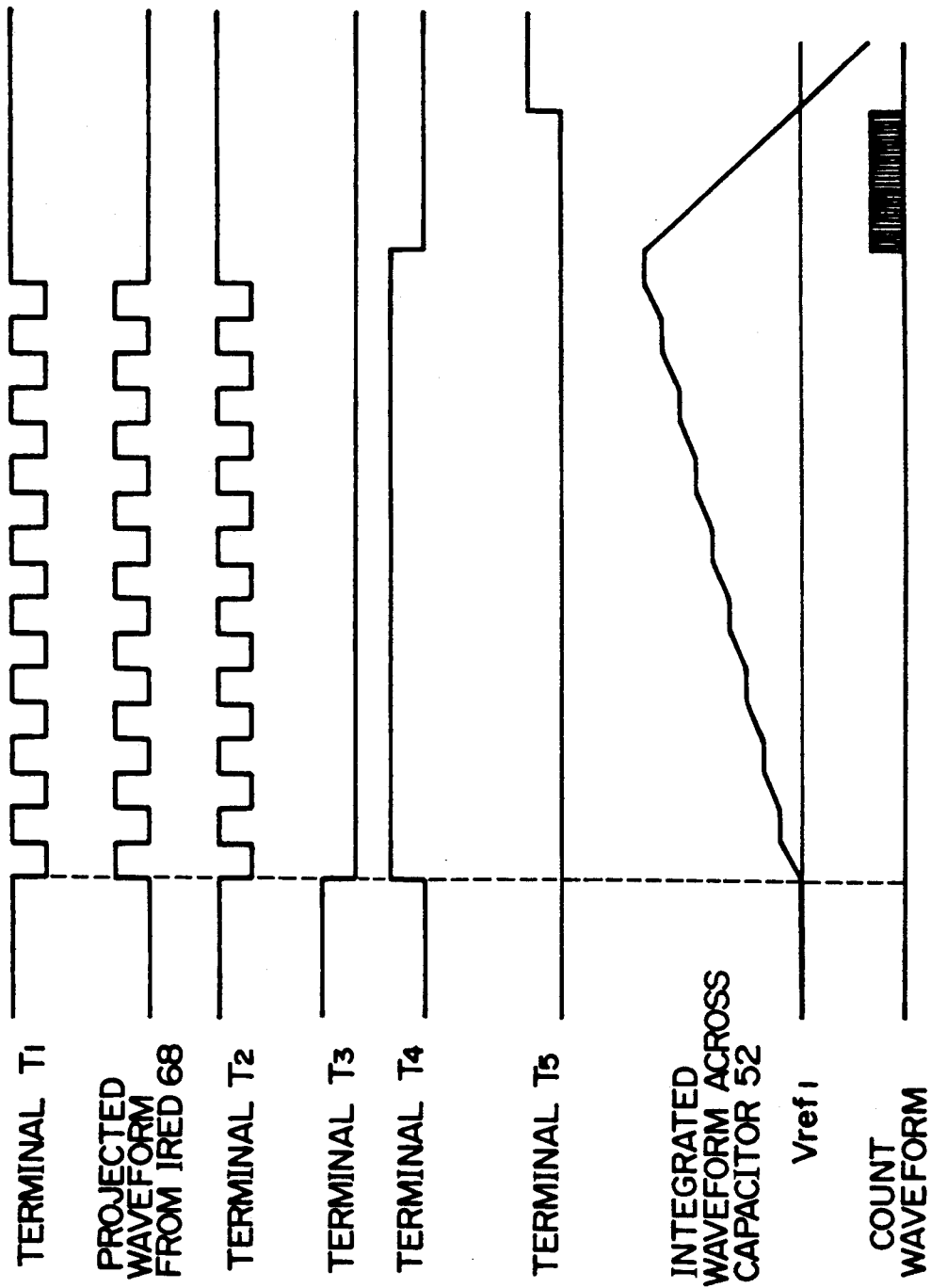
FIG. 5 shows a series of timing charts of various signals which are delivered by a control circuit shown in FIG. 4.

FIG. 4 is a circuit diagram of a specific distance determining circuit used in the distance detecting apparatus of the invention, including the detector circuit illustrated in FIG. 1. FIG. 5 shows a series of timing charts of signals which are delivered from a control circuit 25 shown in FIG. 4. Specifically, the distance detecting apparatus comprises light projection circuit 21 which projects a light pulse toward an object, the distance to which is to be determined, a photocurrent detector circuit 22 which receives reflected light from such object to detect resulting photocurrents and to superimpose bias currents thereon, a calculation and output circuit 23 which derives information representing a distance to the object from voltages across compression diodes through which the photocurrents superimposed with the bias currents pass, a counter circuit 24 for performing an A/D conversion of an output from the output circuit 23, and a control circuit 25 which delivers control signals to various circuits mentioned above.

Specifically describing the arrangement of FIG. 4, the light projection circuit 21 includes a light projecting element 68 in the form of an infrared light emitting diode (IRED) which is driven with a constant current flow by a constant current drive circuit including a transistor 67, resistors 66, 69 and an operational amplifier 65. The drive circuit is controlled to turn on and off by a transistor 70 having its base connected through a series combination of resistors 71 and 74 to a terminal $T_1$ of the control circuit 25. The on/off control of the infrared ray which is projected from IRED 68 as illustrated by "projected waveform" shown in FIG. 5 is made in accordance with an output signal from the terminal $T_1$ of the control circuit 25 (see FIG. 5).

The photocurrent detector circuit 22 includes a preamplifier, a background light elimination circuit and a ratio preset circuit. A first photocurrent $I_1$ from one of the anodes of PSD 1 is preamplified and has its background light eliminated by circuitry including transistors 2, 8, 9 and 4 and operational amplifiers 3, 5 of the detector circuit 22, and then is superimposed with a bias current delivered by the bias current ratio preset circuit which comprises transistors 12, 15 and 18 and diodes 13 and 14 before it passes through a logarithmic compression diode 11.

The operational amplifier 3 which amplifies the first photocurrent $I_1$ has a feedback connection thereacross by means of the transistor 2 which has its emitter connected to the output of the amplifier and its base connected to the inverting input terminal thereof. In this manner, the input impedance to the base of the transistor 2 is equivalently reduced to the order of several hundreds ohms, allowing the photocurrent $I_1$ to be entirely fed as a base current without being influenced by the photocurrent ratio $I_1:I_2$ of PSD 1. A signal which is equal to this input current amplified by a current amplification factor B of the transistor 2 is fed to transistors 8 and 9 of a next following stage, which form a first current mirror circuit. The transistor 9 has its collector connected to a constant current source 10 which is a current sink and to the non-inverting input terminal of the amplifier 5 in the background light elimination circuit.

The amplifier 5 is activated, when no projection of light occurs, as the transistor 6 is turned on by an output signal of "H" level from the terminal $T_1$ of the control circuit 25 applied through resistors 74, 73, to store an amount of charge depending on the brightness of background light across a capacitor 7 connected to the output of the amplifier 5. A feedback loop formed by the capacitor 7 and the transistor 4 is effective to drain a photocurrent component from PSD 1 which is caused by background light and a bias current component to the amplifier 3 and hence to a ground line, as a collector current from the transistor 4. Consequently, the magnitude of the collector current from the transistor 2 is independent of the magnitude of background light, assuming a constant value which is determined by the constant current source 10. When the projection of light occurs, the transistor 6 is turned off, whereby the amplifier 5 becomes inactive. However, the transistor 4 continues to drain the photocurrent which results from the background line to the ground line as a result of the stored charge across the capacitor 7, so that the first pulse current from one of the anodes of PSD 1 from which the photocurrent component caused by the background light is removed to provide a light pulse component is amplified by a factor of B by the transistor 2, and then folded back by the first current mirror circuit 8, 9 before it is injected into the compression diode 11.

A combination of transistor 12 and diodes 11, 13 and 14 constitutes together a second current mirror circuit, and the anode of the diode 11, which also functions as a compression diode, is connected to the collector of the transistor 9 which forms the first current mirror circuit. By virtue of the characteristic of the current mirror circuit, the current passing through the transistor 12 and the diode 11 is equal to the current passing through the diodes 13, 14. In addition, since the diodes 13, 14 and the transistor 15 are connected in series, the current passing through the diode 11 is equal to the current $I_{B1}$ passing through the transistor 15. Accordingly, the pulse current which is injected into the compression diode 11 during the projection of light will be detected in superimposition with the bias current which is equivalent to the collector current $I_{B1}$ of the transistor 15.

The second photocurrent $I_2$ from the other anode of PSD 1 is processed in a similar manner by a circuitry including transistors 2A, 8A, 9A, 4A and operational amplifiers 3A, 5A, whereby it will be detected by the anode of the compression diode 11A in superimposition with the bias current which is equivalent to the collector current $I_{B2}$ of the transistor 15A.

A combination of transistors 15, 18 and transistors 15A, 18A each forms a third current mirror circuit. The third current mirror circuit is fed with a constant current from a fourth current mirror circuit comprising transistors 35, 36, 37 and a constant current source 38. Representing the current from the source 38 by $I_B$, it will be seen that the collector current from each of the transistors 35, 36, 37 will be equal to $I_B$ by virtue of the characteristic of the current mirror circuit.

Since the transistor 36 is connected in series with the transistor 18, the current passing through the transistor 18 is equal to the constant current $I_B$. On the other hand, a resistor 16 and a variable resistor 17 are connected to the emitters of transistors 15 and 18, respectively, which form the third current mirror circuit, so that the bias current $I_{B1}$ passing through the transistor 15 will be equal to the current $I_B$ from the source 38 provided the variable resistor 17 and the resistor 16 have an equal resistance. However, as will be described later, the variable resistor 17 is adjusted in order to correct a calculated output in accordance with a distance to an object being photographed, and hence generally $I_{B1} \neq I_B$. Since the transistor 18A is in series with the transistor 35, the current $I_{B2}$ passing through the transistors 15A, 18A which forms another third current mirror circuit is equal to $I_B$, with consequence that $I_{B1} \neq I_{B2}$ as a general rule.

By changing the resistance of the variable resistor 17, the magnitude of the bias current $I_{B1}$ can be increased or decreased, thus allowing the bias current ratio $I_{B2}/(I_{B1} + I_{B2})$ to be preset arbitrarily. In this manner, a signal voltage obtained from the anode of the compression diode 11 or 11A is supplied to the bases of transistors 41, 42 in the calculation and output circuit 23.

The calculation and output circuit 23 comprises transistors 41, 42, and 44 to 46 and a constant current source 43, and forms a logarithmic expansion circuit which derives a calculated output representing a distance determined. Transistors 41, 42 which form together a differential amplifier have their bases connected to the anodes of the compression diodes 11, 11A either directly or through buffer amplifiers, not shown, while their emitters are connected in common to the source 43. The collector of the transistor 42 is connected to the respective bases of transistors 44 to 46, which form current mirror circuits, and to the collector of the transistor 44.

It will be noted that the current which passes through the diodes 11, 11A represents a sum of the photocurrents $I_1$, $I_2$ from the respective anode of PSD 1 and the bias currents $I_{B1}$, $I_{B2}$. Accordingly, representing a current which flows into the base of transistor 41 or 42 by $I_{1b}$, $I_{2b}$, we have $$I_{1b} = I_1 + I_{B1} \quad (33)$$
$$I_{2b} = I_2 + I_{B2}$$

Assuming that the source 43 provides a constant current of $I_E$, the collector current Ic of the transistor 42 is given as follows:

$$Ic = \frac{I_{2b}}{I_{1b} + I_{2b}} I_E \quad (34)$$

The current Ic corresponds to the calculated output given by the equation (21) multiplied by the coefficient $I_E$. The substitution of the equation (33) into the equation (34) yields:

$$Ic = \frac{I_2 + I_{B2}}{I_1 + I_2 + I_{B1} + I_{B2}} I_E \quad (35)$$

Accordingly, a determination of the collector current Ic of the transistor 42 allows a distance to an object being photographed to be determined. By virtue of the characteristic of current mirror circuits, the current Ic also passes through a collector of the transistor 46, the collector current of which therefore represents a calculated output. The calculation and output circuit 23 operates in a manner such that, representing a collector current passing through the transistor 41 as $I_{c1}$, the following equalities apply:

$$\begin{cases} V_T \ln \frac{I_{B1}}{I_S} - V_T \ln \frac{I_{c1}}{I_S} = V_T \ln \frac{I_{B2}}{I_S} - V_T \ln \frac{I_c}{I_S} \\ I_E = I_{c1} + I_c \end{cases}$$

As mentioned previously, the bias currents $I_{B1}$, $I_{B2}$ flow through the compression diodes 11, 11A, respectively, as superimposed upon the first photocurrent $I_1$ and the second photocurrent $I_2$, respectively. Anode potentials $V_1$, $V_2$ of the diodes 11, 11A will now be considered which occur when an object being photographed is located sufficiently remote to produce a sufficiently low value of either photocurrent $I_1$, $I_2$, assuming that there is no background light for the convenience of simplicity. Representing the charge of an electron by q, the absolute temperature by T, Boltzmann's constant by k, a reverse saturation current by Is and a thermal voltage by $V_T$, the potentials are given as follows:

$$V_1 = V_T \ln \frac{I_{B1}}{I_s} \quad (36)$$

$$V_2 = V_T \ln \frac{I_{B2}}{I_s} \quad (37)$$

This means that the anode potential of either compression diode 11, 11A is determined only by the bias current $I_{B1}$ or $I_{B2}$. At this time, the calculated output Ic will be derived from the equation (35) as follows:

$$Ic = \frac{I_{B2}}{I_{B1} + I_{B2}} I_E$$

When an object being photographed is sufficiently closely located to the detector to produce values of photocurrents $I_1$, $I_2$ from PSD 1 which are high in comparison to the bias current $I_{B1}$, $I_{B2}$, the anode potentials $V_1$, $V_2$ of the compression diodes 11, 11A will be given as follows:

$$V_1 = V_T \ln \frac{I_1}{I_s} \quad (38)$$

$$V_2 = V_T \ln \frac{I_2}{I_s} \quad (39)$$

from the equation (35), we have:

$$Ic = \frac{I_2}{I_1 + I_2} I_E$$

In a conventional distance measuring circuit, it is assumed that $I_{B1} \approx I_{B2}$, whereby the calculated output Ic will be equal to $I_E/2$. By contrast, in the present embodiment, the bias current $I_{B2}$ is chosen to be constant and equal to $I_B$ from the source 38 while the bias current $I_{B1}$ is chosen, by the choice of transistors 15, 18, the resistance $R_1$ of resistor 16 and the adjustment of the resistance $R_2$ of the variable resistor 17 so as to satisfy the following relationship:

$$V_T \ln \frac{I_{B1}}{I_B} = R_2 I_B - R_1 I_{B1} \quad (40)$$

In this manner, by arbitrarily presetting the bias current ratio $I_{B2}/(I_{B1}+I_{B2})$, the calculated output is made to be proportional to the reciprocal of a distance to an object being photographed over the entire range across which a distance measurement is enabled. While an adjustment of the variable resistor is utilized in the present embodiment, it should be understood that it may be replaced by a fixed resistor which provides a predetermined bias current ratio.

The counter circuit 24 is operative to eliminate a background component of the calculated output from the collector current of the transistor 46 and to feed the result to the control circuit 25 which includes a counter mechanism, not shown, thus providing a digital output.

Transistor 48 controls a circuit which stores a background component of the calculated output. Specifically, the transistor 48 has its base connected to a terminal $T_2$ of the control circuit 25 through a resistor 75 so as to be turned on and off by an output signal (see FIG. 5) supplied from the terminal $T_2$. Specifically, the transistor 48 is turned on when no projection occurs. When the transistor 48 is turned on, a feedback loop comprising an operational amplifier 47, transistor 50 and capacitor 49 provides a collector current Ic given by the equation (35) to transistor 50. Transistors 50 and 51 form current mirror circuits, whereby the current Ic also passes through the transistor 51. At this time a charge corresponding to the background light is stored across the capacitor 49. When no projection of light occurs, $I_1 = I_2 = 0$. Accordingly the charge which is stored across the capacitor 49 will be such as to cause the transistors 50, 51 to drain the following amount of current to the ground, as given by the equation (35):

$$Ic = \frac{I_{B1}}{I_{B1} + I_{B2}} \cdot I_E$$

Thus, the transistor 51 is operative to drain a calculated output which is obtained when an object being photographed is located at infinity to the ground. When projection occurs, the transistor 48 is turned off and the amplifier 47 is inoperative, and hence the charge stored across the capacitor 49 is effective to maintain the drain current from the transistor 51.

In this manner, a current corresponding to a calculated output which represents a distance to an object being photographed which is located at a finite distance and from which an output obtained when the object is located at infinity is subtracted flows to a capacitor 52 to store a corresponding charge thereacross for each projection. An operational amplifier 53 serves as the means for resetting the capacitor 52, and is controlled by a transistor 54 having its base connected to a terminal $T_3$ of the control circuit 25 through a resistor 76. Thus, an output signal (see FIG. 5) from the terminal $T_3$ turns the transistor 54 on to preset the potential of the capacitor 52 to a reference voltage Vrefl, and turns it off to disable the amplifier 53 immediately before the initiation of the projection of light. Subsequently, the potential of the capacitor 52 increases in response to an injected current thereto.

Upon termination of a given number of projections of light, a terminal $T_4$ changes from H to L level, as indicated in the timing chart of FIG. 5, whereby transistor 63 is turned off, and the capacitor 52 is discharged through a transistor 55. At the same time, a counter internally housed within the control circuit 25 is activated, and continues to count up until an output from a comparator 62 or a terminal $T_5$ shown in FIG. 5 reaches its H level. An output from the comparator 62 changes from its L to H level when the voltage across the capacitor 52 decreases below a reference voltage Vrefl. The rate of discharge of the capacitor 52 is determined by a constant current source 61, resistors 58, 59 and transistors 57, 60. It will be noted that the resistor 59 is shown as a variable resistor, which may be adjusted to provide any desired discharge rate. In this manner, an output corresponding to a distance to an object being photographed may be derived as a count in the counter which is contained within the control circuit 25.

In the distance detecting apparatus mentioned above, the variable resistor 17 is adjusted in accordance with the following procedure:

(i) The determination of a pair of distances, which are relatively short, is attempted, providing a count $c_1$ for a distance $a_1$ and another count $c_2$ for another distance $a_2$.

(ii) A count corresponding to the object located at infinity is calculated according to the following formula:

$$c_\infty = c_2 - \frac{1/a_2}{1/a_1 - 1/a_2}(c_1 - c_2) \quad (41)$$

This equation provides a formula for deriving a rectilinear line $l_5$ as indicated in FIG. 2A from a pair of determined values $(1/a_1 c_1)$ and $(1/a_2 c_2)$, and for calculating the coordinates of a point of intersection $P_1$ with the ordinate or a determined value for the distance of infinity.

(iii) The light receiving section is shielded from any light, and the variable resistor 17 is adjusted so that the count becomes substantially equal to $c_\infty$.

In the described embodiment, the light receiving element has been assumed as comprising a PSD for the convenience of description. However, it should be understood that the light receiving element is not limited thereto, and for example, an SPD (silicon photodiode) may be divided into two sections which function as $SPD_1$, $SPD_2$. In this instance, the center of the PSD corresponds to a position where the spot image which is distributed across the sections $SPD_1$ and $SPD_2$ has an equal amount of light across each section. The optical arrangement may be chosen in consideration of this.

Figure 9:
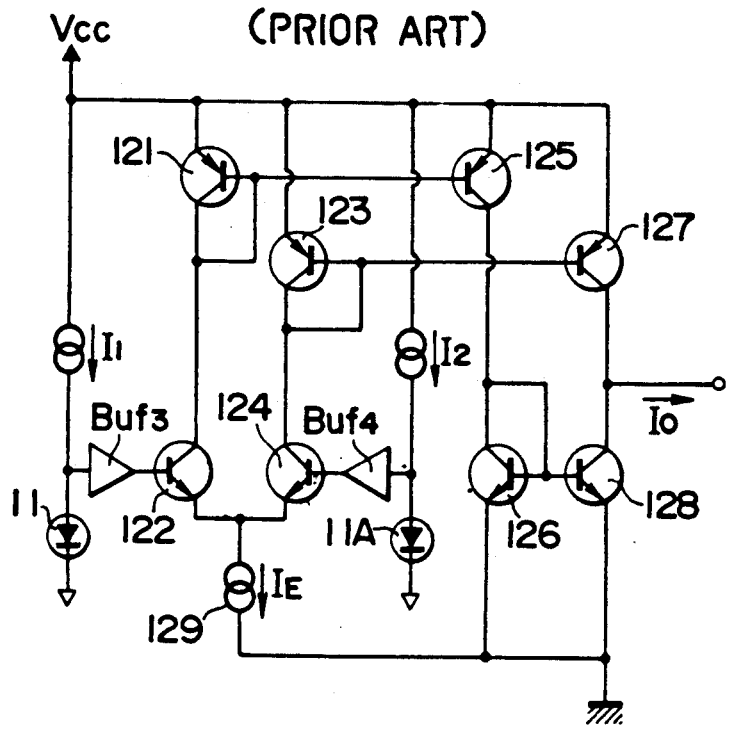
FIG. 9 is a circuit diagram of another example of distance calculation circuit used in a conventional distance detecting apparatus.
Figure 10:
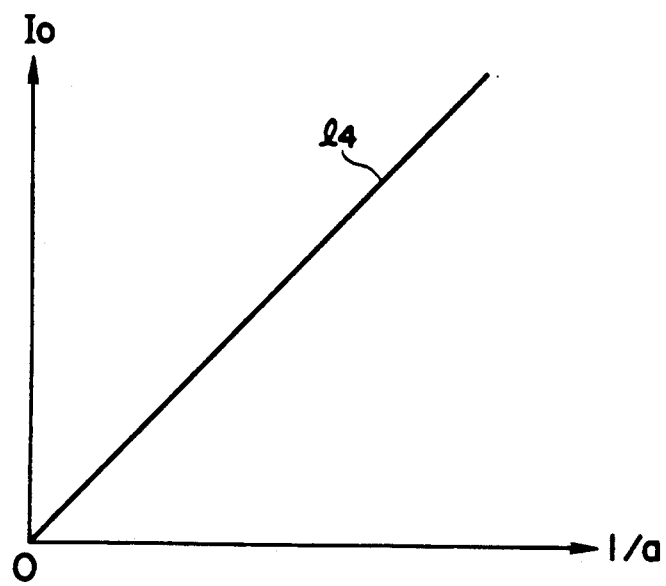
FIG. 10 graphically shows a relationship between a calculated output and a distance to an object being photographed which illustrates the response obtained with an arrangement shown in FIG. 9.

In the above embodiment, the formula $I_2/(I_1+I_2)$ has been employed. However, where the formula $(I_2-I_1)/(I_1+I_2)$ is employed as shown in FIG. 9, the bias current ratio $(I_{B2}-I_{B1})/(I_{B1}+I_{B2})$ may be adjusted to be close to $-\Delta x/t$.

Figure 11:
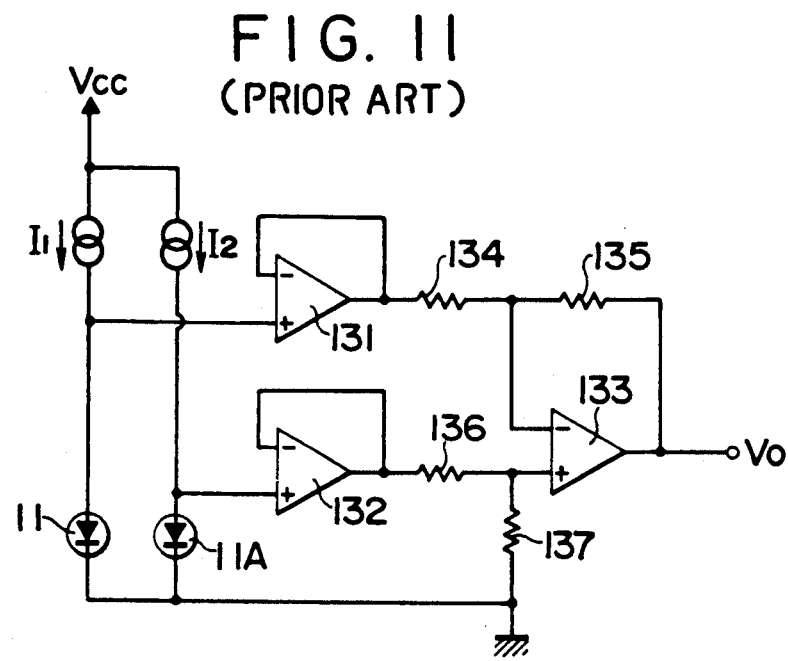
FIG. 11 is a circuit diagram of a further example of distance calculation circuit used in a conventional distance detecting apparatus.
Figure 12:
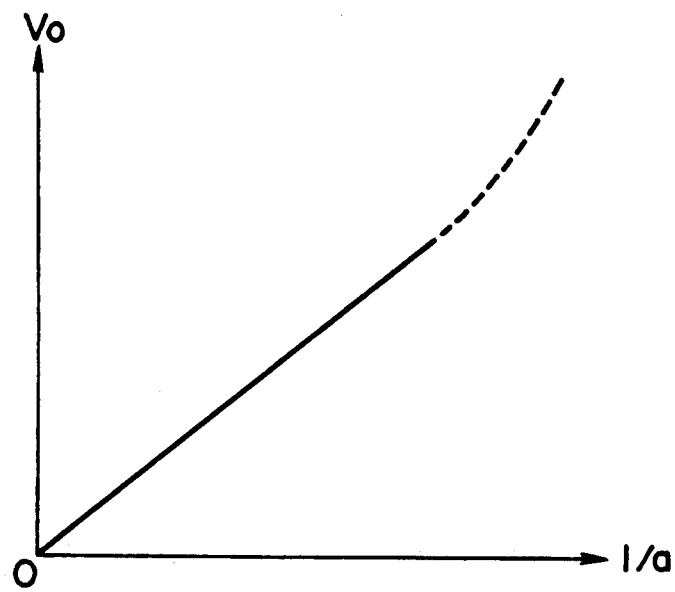
FIG. 12 graphically shows a relationship between a calculated output and a distance to an object being photographed which illustrates the response obtained with an arrangement shown in FIG. 11.
Figure 13:
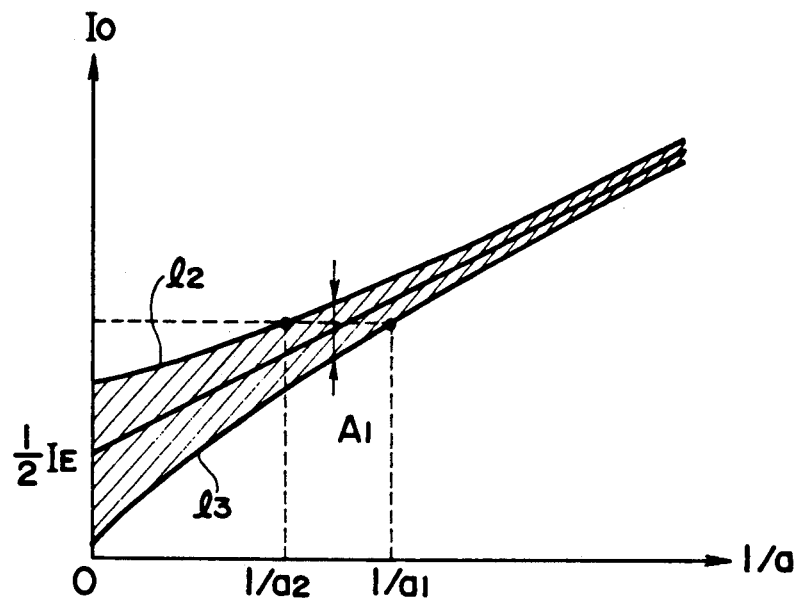
FIGS. 13 and 14 graphically show the relationship between a calculated output and a distance to an object being photographed when random noise is superimposed in a photocurrent detector circuit of a conventional distance detecting apparatus, FIG. 13 corresponding to a reduced slope and FIG. 14 corresponding to an increased slope.
Figure 14:
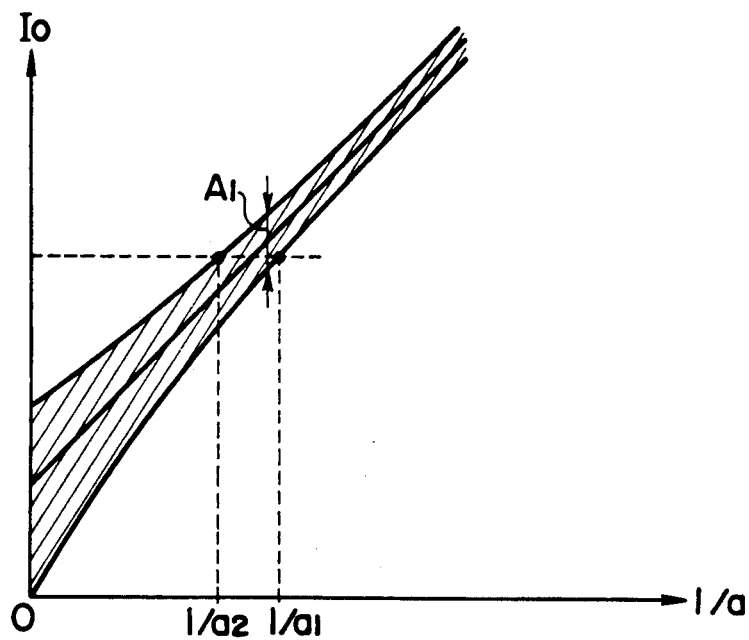
Figure 15A:
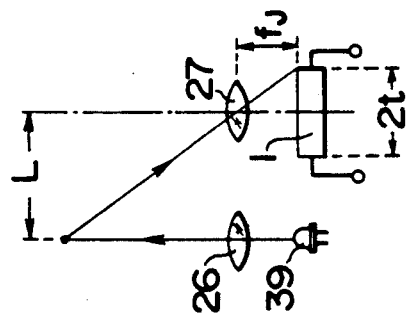
FIGS. 15A to 15E illustrate distance detection circuits employing the principle of the triangulation, specifically, FIG. 15A illustrating a conventional practice, FIG. 15B illustrating the use of a baseline having a doubled length, FIG. 15C illustrating the use of light receiving lens having a doubled focal length, FIG. 15D illustrating a PSD which has its total length halved, and FIG. 15E illustrating a shift of the center of PSD away from light projecting means.
Figure 15B:
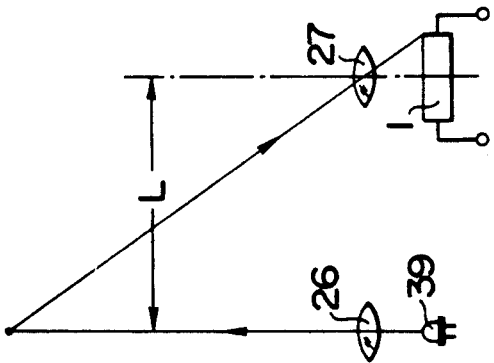
Figure 15C:
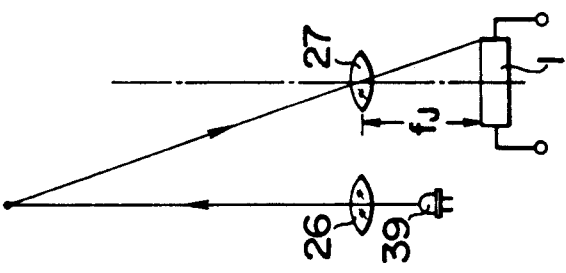
Figure 15D:
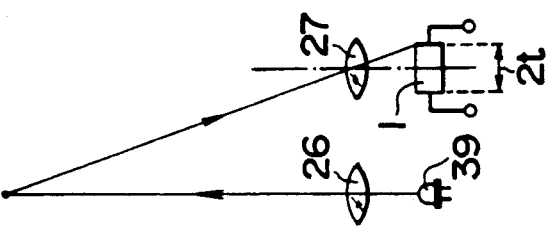
Figure 15E:
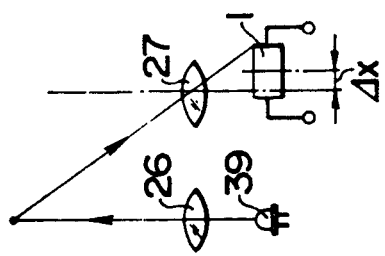
Figure 16:
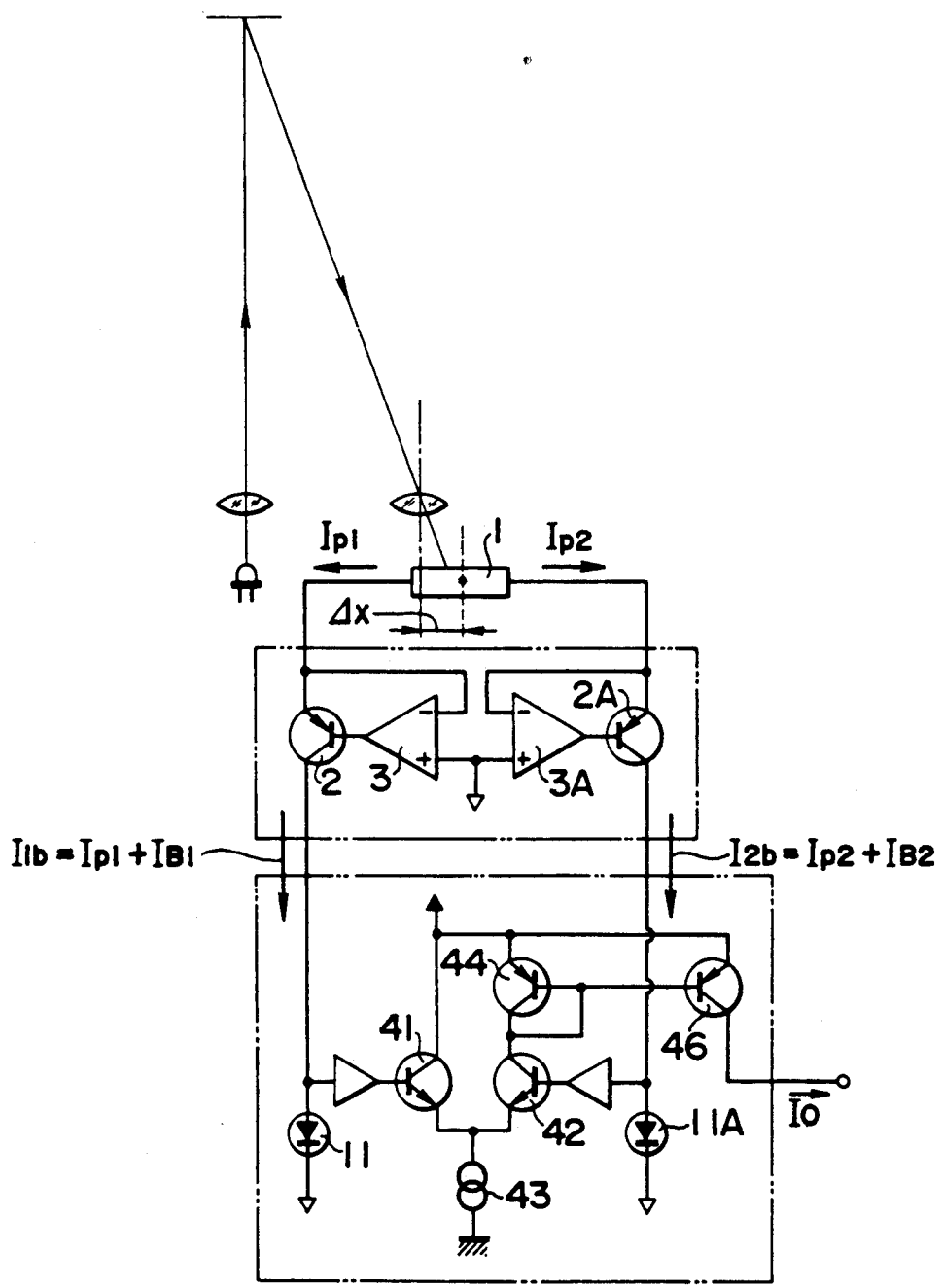
FIG. 16 is a circuit diagram of essential parts of a signal light detection circuit and a distance calculation circuit, illustrating the issues which arise when an arrangement for a PSD as shown in FIG. 15E is employed.

Similarly, where the formula $V_T \ln I_2/I_1$ is utilized in the arrangement of FIG. 11, the bias current ratio $I_{B2}/I_{B1}$ may be established close to $(t-\Delta x)/(t+\Delta x)$.

What is claimed is:

1. A distance detecting apparatus including light projection means for projecting a light beam upon an object, and a light receiving element including a photoelectric transducer element which receives reflected light from an object being photographed, said photoelectric transducer element producing a photocurrent having a value which varies in accordance with the position of light impingement; the apparatus comprising:

the photoelectric transducer element being positioned so that an imaging point which is formed by reflected light from an object which is located at infinity is located at a position along the transducer element which is toward the light projection means with respect to the center of the photoelectric transducer element;

means for generating a constant bias current;

means for receiving said constant bias current and said photocurrent;

said means for receiving including a detector circuit for detecting the photocurrent produced by the photoelectric transducer element as superimposed with the constant bias current;

a calculation and output circuit for calculating and outputting information representing a distance to an object being photographed from the photocurrent output which is superimposed with the constant bias current;

said constant bias current generating means further comprising a bias current preset circuit for presetting the constant bias current;

and said bias current preset circuit presetting a bias current ratio so that the output from the calculation and output circuit is substantially proportional to the reciprocal of the distance to an object being photographed over an entire range across which the determination of distances is enabled.

2. A distance detecting apparatus according to claim 1 in which the photoelectric transducer element comprises a semiconductor position sensitive detector.

3. A distance detecting apparatus including light projection means for projecting a light beam upon an object, and a light receiving element including a photoelectric transducer element which receives reflected light from an object being photographed, said photoelectric transducer element producing a photocurrent having a value which varies in accordance with the position of light impingement; the apparatus comprising:

the photoelectric transducer element being positioned so that an imaging point which is formed by reflected light from an object which is located at infinity is located at a position along the transducer element which is toward the light projection means with respect to the center of the photoelectric transducer element;

means for generating a bias current;

means for receiving said bias current and said photocurrent;

said means for receiving including a detector circuit for detecting the photocurrent produced by the photoelectric transducer element as superimposed with the bias current;

a calculation and output circuit for calculating and outputting information representing a distance to an object being photographed from the photocurrent output which is superimposed with the bias current;

said bias current generating means further comprising a bias current preset circuit for presetting the constant bias current;

said bias current preset circuit presetting a bias current ratio so that the output from the calculation and output circuit is substantially proportional to the reciprocal of the distance to an object being photographed over an entire range across which the determination of distances is enabled;

said detector circuit including impedance transformer means for performing an impedance transformation for a signal photocurrent which is delivered from the photoelectric transducer element, said calculation and output circuit including a logarithmic compression diode, an output from the impedance transformer means being supplied to said logarithmic compression diode in the calculation and output circuit.

4. A distance detecting apparatus including light projection means for projecting a light beam upon an object, and a light receiving element including a photoelectric transducer element which receives reflected light from an object being photographed, said photoelectric transducer element producing a photocurrent having a value which varies in accordance with the position of light impingement; the apparatus comprising:

the photoelectric transducer element being positioned so that an imaging point which is formed by reflected light from an object which is located at infinity is located at a position along the transducer element which is toward the light projection means with respect to the center of the photoelectric transducer element;

means for generating a bias current;

means for receiving said bias current and said photocurrent;

said means for receiving including a detector circuit for detecting the photocurrent produced by the photoelectric transducer element as superimposed with the bias current;

a calculation and output circuit for calculating and outputting information representing a distance to an object being photographed from the photocurrent output which is superimposed with the bias current;

said bias current generating means further comprising a bias current preset circuit for presetting the constant bias current;

said bias current preset circuit presetting a bias current ratio so that the output from the calculation and output circuit is substantially proportional to the reciprocal of the distance to an object being photographed over an entire range across which the determination of distances is enabled;

said bias current preset circuit comprising transistors forming current mirror circuits, resistors coupled to said transistors for presetting the magnitudes of said bias currents, and a constant current source coupled to said current mirror circuits for providing a constant current to each transistor of the current mirror circuits.

5. A distance detecting apparatus including light projection means for projecting a light beam upon an object, and a light receiving element including a photoelectric transducer element which receives reflected light from an object being photographed, said photoelectric transducer element producing a photocurrent having a value which varies in accordance with the position of light impingement; the apparatus comprising:

the photoelectric transducer element being positioned so that an imaging point which is formed by reflected light from an object which is located at infinity is located at a position along the transducer element which is toward the light projection means with respect to the center of the photoelectric transducer element;

means for generating a bias current;

means for receiving said bias current and said photocurrent;

said means for receiving including a detector circuit for detecting the photocurrent produced by the photoelectric transducer element as superimposed with the bias current;

a calculation and output circuit for calculating and outputting information representing a distance to an object being photographed from the photocurrent output which is superimposed with the bias current;

said bias current generating means further comprising a bias current preset circuit for presetting the constant bias current;

said bias current preset circuit presetting a bias current ratio so that the output from the calculation and output circuit is substantially proportional to the reciprocal of the distance to an object being photographed over an entire range across which the determination of distances is enabled;

said bias current preset circuit establishing a bias current ratio $I_{B2}/(I_{B1}+I_{B2})$ where $I_{B1}$ and $I_{B2}$ represent the bias currents generated by the bias current preset circuit, said ratio being chosen such that a calculated output $I_O$ from the calculation and output circuit is close to or less than $\frac{1}{2}-\Delta x/2t$ where 2t represents the total length of said photoelectric transducer element and $\Delta x$ represents the shift of the image point from the center of the photoelectric transducer element in a direction away from the light projecting element.

6. A distance detecting apparatus according to claim 4 wherein said current mirror circuits generate bias currents $I_{B1}$ and $I_{B2}$ in which at least one of the resistors connected in the current mirror circuit which provides the bias current represented by ($I_{B2}$) comprises a variable resistor.

7. A distance detecting apparatus comprising:
a projection circuit for projecting a light pulse upon an object, the distance of which is to be determined;
a photocurrent detector circuit for receiving reflected light from the object to provide a photocurrent, a bias current preset circuit for generating a bias current;
a compression diode coupled to said detector circuit and said preset circuit whereby the photocurrent is superimposed upon said bias current which is in turn preset by said bias current preset circuit;
a calculation and output circuit for deriving information representing the distance to the object being photographed from a voltage across said compression diode through which the photocurrent superimposed with the bias current passes;
A/D conversion means for providing an A/D conversion of an output from the calculation and output circuit;
and a control circuit for delivering control signals to said circuits.

8. A distance detecting apparatus according to claim 7 in which the projection circuit includes a light projecting element in the form of an infrared emitting diode for projecting a light pulse.

9. A distance detecting apparatus according to claim 7 in which the photocurrent detector circuit comprises a preamplifier for amplifying the photocurrent and a background light elimination circuit for removing background noise from the amplified photocurrent signal.

10. A distance detecting apparatus comprising:

projection means for projecting a light pulse upon an object;

a semiconductor position sensitive element spaced by a baseline length from the projection means and positioned so that the point representing the center of the light reflected from the object which is at an infinity position is located at a position along the element closer to the light projection means with respect to the center of the semiconductor position sensitive element, the element including a pair of electrodes which deliver signal currents with a current ratio which corresponds to an imaging position thereon of reflected light from the object which is located at infinity;

a current superimposition circuit for superimposing a bias current on each signal current which is delivered from the pair of electrodes;

and a calculation circuit for calculating a distance to the object on the basis of an output from the current superimposition circuit, the bias currents being chosen so that one calculated distance does not correspond to two distances to the object.

11. A distance detecting apparatus according to claim 10 in which representing the pair of signal currents as $I_{p1}$, $I_{p2}$ and representing the respective bias currents as $I_{b1}$, $I_{b2}$, the calculation circuit includes means to provide a calculated output representing the distance to the object according to the following formula:

$$\text{calculated output } I_0 = \frac{I_2}{I_1 + I_2}$$

where $I_1 = I_{p1} + I_{b1}$ and $I_2 = I_{p2} + I_{b2}$.

12. A distance detecting apparatus according to claim 11 in which a bias current ratio $I_{b2}/(I_{b1}+I_{b2})$ is chosen so that the calculated output $I_O$ is close to or less than a value $\frac{1}{2}-\Delta x/2t$ where 2t represents the total length of the portion of the position sensitive element which receives the image of an object and where $\Delta x$ is the displacement distance of the image from a predetermined location along said portion of the position sensitive element.

13. A distance detecting apparatus according to claim 10 in which representing the pair of signal currents as $I_{p1}$, $I_{p2}$ and representing the respective bias currents as $I_{b1}$, $I_{b2}$, the calculation circuit determines a calculated output representing the distance to the object according to the following formula:

$$\text{calculated output } I_0 = \frac{I_2 - I_1}{I_1 + I_2}$$

where $I_1 = I_{p1} + I_{b1}$ and $I_2 = I_{p2} + I_{b2}$.

14. A distance detecting apparatus according to claim 13 in which a bias current ratio $(I_{b2}-I_{b1})/(I_{b1}+I_{b2})$ is chosen so that the calculated output $I_O$ is close to or less than a value $-\Delta x/2t$ where 2t represents the total length of the portion of the position sensitive element which receives the image of an object and where $\Delta x$ is the displacement of the image from a predetermined location along said portion of the position sensitive element.

15. A distance detecting apparatus according to claim 10 in which, representing the pair of signal currents as $I_{p1}$, $I_{p2}$ and representing the respective bias currents as $I_{b1}$, $I_{b2}$, the calculation circuits derive the calculated output representing the distance to the object according to the following formula:

calculated output $I_0 = V_T \ln I_1/I_2$ where $I_1 = I_{p1} + I_{b1}$ and $I_2 = I_{p2} + I_{b2}$ and $V_T$ represents a thermal voltage.

16. A distance detecting apparatus according to claim 15 in which a current bias ratio $I_{b2}/I_{b1}$ is chosen so that the calculated output $I_0$ is close to or less than a value $(t - \Delta x)/(t + \Delta x)$ where 2t represents the total length of the portion of the position sensitive element which receives the image of an object and where $\Delta x$ is the displacement distance of the image from a predetermined location along said portion of the position sensitive element.

17. A distance detecting apparatus for a camera comprising:
projection means for projecting light toward an object;
a semiconductor position sensitive element for receiving reflected light from an object being photographed as a light beam is projected thereto from said projection means and for producing a pair of signal currents depending on the position thereon of incidence of the reflected light, the semiconductor position sensitive element being positioned so that reflected light from an object being photographed which is located at infinity impinges thereon at a position which is displaced toward the projection means from the center of the element;
superimposition circuit means for superimposing bias currents upon the pair of signal currents;
a bias current preset circuit for presetting predetermined bias currents which are superimposed upon the pair of signal currents;
and a calculation circuit for calculating a distance to an object on the basis of an output from the superimposition circuit means;
the predetermined values of said bias currents being selected so that the calculated output is substantially proportional to the reciprocal of a distance to an object to be photographed over an entire range across which the determination of distance is enabled.

18. A distance detecting apparatus according to claim 17 in which the projection means includes means for projecting a plurality of light pulses consecutively, whereby a calculation is made responsive to each light pulse.

19. A distance detecting apparatus according to claim 18, further including means for summing the calculated outputs for each light pulse, an A/D converter for performing an A/D conversion of an analog output from the sum of outputs of the calculation circuit, the A/D converter being effective to convert a distance determined by the calculations responsive to the consecutive light pulses into a digital value.

20. A distance detecting apparatus according to claim 18 in which the bias current ratio is chosen to be a value which corresponds to the object being located at infinity.

21. A method for operating a distance detecting apparatus comprised of a semi-conductor position sensitive element for receiving reflected light to produce a pair of signal currents whose magnitudes are dependent on the position thereon of light reflected from an object whose distance from the apparatus is being determined, said method comprising the steps of:
(a) projecting light from a location in close proximity to said position sensitive element toward an object;
(b) focusing the light reflected from the object recited in step (a) upon said position sensitive element;
(c) positioning said position sensitive element so that the imaging point formed by the reflected light from the object recited in step (a) which is located at a distance which may be considered infinity impinges upon said position sensitive element at a point displaced by a displacement distance from the center of said position sensitive element toward said light projection location;
(d) superimposing a respective bias current $I_{B1}$, $I_{B2}$ upon each of the current signals developed by the outputs of said position sensitive element; and
(e) calculating the distance of the object recited in step (a) utilizing the currents superimposed on said base currents;
(f) said bias currents being adjusted so that the calculated distance is substantially proportional to the reciprocal of the distance to said object over the entire surface of the position sensitive element.

22. The method of claim 21 wherein the bias current ratio $I_{B2}/(I_{B1} + I_{B2})$ yields an output from the calculation which is close to or less than $\frac{1}{2} - \Delta x/2t$ where 2t represents the total length of said position sensitive element and $\Delta x$ represents the said displacement distance.

23. The method of claim 21 wherein the calculated distance is an analog value and further comprising the step of converting said analog value to a digital value.

24. The method of claim 21 in which, representing the pair of signal currents as $I_{p1}$, $I_{p2}$ and representing the respective bias currents as $I_{b1}$, $I_{b2}$ the distance to the object is calculated according to the following formula:

calculated output $I_0 = I_2/I_1 + I_2$ where $I_1 = I_{p1} + I_{b1}$ and $I_2 = I_{p2} + I_{b2}$.

25. The method of claim 24 in which a bias current ratio $(I_{b2}/I_{b1} + I_{b2})$ is chosen so that the calculated output $I_0$ is close to or less than a value $\frac{1}{2} - \Delta x/2t$ where 2t represents the total length of said position sensitive element and $\Delta x$ represents the said displacement distance.

26. The method of claim 21 in which, representing the pair of signal currents as $I_{p1}$, $I_{p2}$ and representing the respective bias currents as $I_{b1}$, $I_{b2}$, the distance to the object is calculated according to the following formula:

calculated output $I_0 = (I_2 - I_1)/(I_1 + I_2)$ where $I_1 = I_{p1} + I_{b1}$ and $I_2 = I_{p2} + I_{b2}$.

27. The method according to claim 26 in which a bias current ratio $(I_{b2} - I_{b1})/(I_{b1} + I_{b2})$ is chosen so that the calculated output $I_0$ is close to or less than a value $-\Delta x/2t$ where 2t represents the total length of said position sensitive element and $\Delta x$ represents the said displacement distance.

28. The method according to claim 21 in which, representing the pair of signal currents as $I_{p1}$, $I_{p2}$ and representing the respective bias currents as $I_{b1}$, $I_{b2}$, the distance to the object is calculated according to the following formula:

calculated output $I_0 = V_T \ln I_1/I_2$ where $I_1 = I_{p1} + I_{b1}$ and $I_2 = I_{p2} + I_{b2}$ and VT is a thermal voltage.

29. The method according to claim 28 in which a current bias ratio $I_{b2}/I_{b1}$ is chosen so that the calculated output $I_0$ is close to or less than a value $(T - \Delta x)/(t + \Delta x)$ where 2t represents the total length of said position sensitive element and $\Delta x$ represents the said displacement distance.

30. A distance measuring apparatus for a camera comprising:
   projection means for projecting a light upon an object to be photographed;
   a semiconductor position sensitive element spaced a predetermined distance from said projection means for receiving the light reflected from the object to be photographed upon which the light is projected, said element including a pair of electrodes which respectively provide photocurrents depending upon the position at which the light is received along said element;
   amplifying means each coupled to one of said electrodes for providing only a change in photocurrent depending on the projection by said light projection means from a respective photocurrent outputted by a respective one of the electrodes of said semiconductor position sensitive element;
   means for generating bias currents;
   a pair of diodes each receiving the output current of one of said amplifying means and one of said bias currents for outputting a logarithmically compressed voltage; and
   calculation means to receive the respective outputs from said pair of diodes for calculating object distance; whereby the output from the calculating means is determined substantially by said bias current when the object to be photographed is at an infinity position and is less influenced by said bias currents and is predominantly influenced by the photocurrents as the distance between the camera and the object to be photographed is reduced.

31. A distance detecting apparatus for a camera according to claim 30 in which said calculation means outputs a signal representing the calculated distance which is determined by a formula $I_2(I_1 + I_2)$ wherein $I_1$ and $I_2$ respectively represent the photocurrent outputs from said pair of electrodes.

32. A distance detecting apparatus for a camera according to claim 31 in which said calculation means outputs a signal representing the calculated distance which is determined by the formula $I_{B2}/I_{B1} + I_{B2})$ wherein $I_{B1}$ and $I_{B2}$ respectively represent the bias currents, when the object to be photographed is at an infinity position.

33. A distance detecting apparatus for a camera according to claim 30 in which said calculation means outputs a signal representing the calculated distance which is determined by the formula $(I_2 - I_1)/(I_1 + I_2)$ wherein $I_1$ and $I_2$ respectively represent the photocurrents outputted from the electrodes of said semiconductor position sensitive element.

34. A distance detecting apparatus for a camera according to claim 33 in which said calculation means outputs a signal representing the calculated distance which is determined by a formula $(I_{B2} - I_{B1})/(I_{B1} + I_{B2})$ wherein $I_{B1}$ and $I_{B2}$ respectively represent the bias currents.

35. A distance detecting apparatus for a camera according to claim 30 in which said calculation means outputs a signal representing the calculated distance which is determined by a formula $V_T \ln(I_1/I_2)$ wherein $I_1$ and $I_2$ represent a pair of photocurrent outputs from the respective pair of electrodes of said semiconductor position sensitive element and $V_T$ represents a thermal voltage.

36. A distance detecting apparatus for a camera according to claim 35 in which said calculation means outputs a calculated distance which is represented by a formula $V_T \ln (I_{B1}/I_{B2})$ wherein $I_{B1}$ and $I_{B2}$ respectively represent the bias currents and $V_T$ represents a thermal voltage when the object to be photographed is at an infinity position.

37. A distance measuring apparatus for a camera comprising:
   projection means for projecting a light upon an object to be photographed;
   a semiconductor position sensitive element spaced by a baseline length from said projection means and being positioned so that the center of the light reflected from an object located at an infinity position is located toward the light projection means with respect to the semiconductor position sensitive element for receiving the light reflected from the object to be photographed upon which the light is projected, said element including a pair of electrodes which respectively provide photocurrents whose values depend upon the position at which the light is received along said element;
   amplifying means for providing only a change in photocurrent depending on the projection by said light projection means from the respective photocurrents outputted by said pair of electrodes of said semiconductor position sensitive element;
   means for generating bias currents;
   a pair of diodes each receiving the output current of one of said amplifying means and one of said bias currents for outputting a logarithmically compressed voltage; and
   calculation means to receive the respective outputs from each of the said diodes for calculating object distance; whereby said bias current generating means presets said bias currents so that the output from the calculating means is determined by said bias current when the object to be photographed is at an infinity position and is less influenced by said bias currents and is predominantly influenced by the photocurrents as the camera approaches the object to be photographed.

38. A distance detecting apparatus for a camera according to claim 37 in which said calculation means outputs a signal representing the calculated distance which is determined by a formula $I_2/(I_1 + I_2)$ wherein $I_1$ and $I_2$ depict a respective photocurrent output from said pair of electrodes.

39. A distance detecting apparatus for a camera according to claim 38 in which bias current generating means sets the bias currents so that $I_{B2}/(I_{B1} + I_{B2})$ approximate to $\frac{1}{2} - (\Delta x/2t)$ wherein $I_{B1}$ and $I_{B2}$ depict the bias currents and 2t represents the total length of said semiconductor position sensitive element and $\Delta x$ represents the shift of the center of the semiconductor position sensitive element in a direction away from the projection means when the object to be photographed is at an infinity position.

40. A distance detecting apparatus for a camera according to claim 37 in which said calculation means outputs a calculated distance which is determined by a formula $(I_2-I_1)/(I_1+I_2)$ wherein $I_1$ and $I_2$ represent a pair of the photocurrents respectively outputted from the electrodes of the semiconductor position sensitive element.

41. A distance detecting apparatus for a camera according to claim 40 in which said bias current generating means presets bias currents so that $(I_{B2}-I_{B1})/(I_{B1}+I_{B2})$ approximates to $-\Delta X/t$ wherein $I_{B1}$ and $I_{B2}$ represent the bias currents, respectively, 2t represents the total length of said semiconductor position sensitive element and $\Delta X$ represents the shift of the center of the semiconductor position sensitive element in a direction away from the projection means when the object to be photographed is at an infinity position.

42. A distance detecting apparatus for a camera according to claim 37 in which said calculation means outputs a calculated distance which is determined by a formula $V_T \ln I_1/I_2$ wherein $I_1$ and $I_2$ represent photocurrent outputs from respective electrodes of said semiconductor position sensitive element and $V_T$ represents a thermal voltage.

43. A distance detecting apparatus for a camera according to claim 42 in which said bias current generating means sets the bias currents so that $V_T \ln (I_{B1}/I_{B2})$ approximates to $(t-\Delta X)/(t+\Delta X)$ wherein $I_{B1}$ and $I_{B2}$ represent the bias currents and 2t represents the total length of the semiconductor position sensitive element and $\Delta X$ represents the shift of the image from the center of the position sensitive element in a direction away from the light projecting means when the object to be photographed is at an infinity position.

* * * * *

UNITED STATES PATENT AND TRADEMARK OFFICE
CERTIFICATE OF CORRECTION

PATENT NO.    : 5,005,970
DATED         : April 9, 1991
INVENTOR(S)   : Keiji Kunishige It is certified that error appears in the above-identified patent and that said Letters Patent is hereby corrected as shown below:

Column 1, line 62, change "Will" to --will--

Column 4, line 5, change "$(1/a-1/a_2)$" to --$(1/a_1-1/a_2)$--

Column 6, line 11, change "$I_{100}$" to --$I\phi$--

Column 8, line 20, change "Ax" to --$\Delta x$--

Column 8, line 27, change "that of an" to --that an--

Column 9, line 38, change "following the" to --the following--

Column 11, line 40, before "ratio" insert --bias current--

Column 22, line 20, change "base" to --bias--

Column 23, line 52, change "$I_{B2}/I_{B1}+I_{B2})$" to --$I_{B2}/(I_{B1}+I_{B2})$--

Signed and Sealed this

Ninth Day of February, 1993

Attest:

STEPHEN G. KUNIN

Attesting Officer

Acting Commissioner of Patents and Trademarks